US008152654B2

(12) United States Patent
Rajagopalan et al.

(10) Patent No.: US 8,152,654 B2
(45) Date of Patent: Apr. 10, 2012

(54) THREE-LAYER-CORE GOLF BALL HAVING HIGHLY-NEUTRALIZED POLYMER OUTER CORE LAYER

(75) Inventors: Murali Rajagopalan, South Dartmouth, MA (US); Michael J. Sullivan, Barrington, RI (US)

(73) Assignee: Acushnet Company, Fairhaven, MA (US)

( * ) Notice: Subject to any disclaimer, the term of this patent is extended or adjusted under 35 U.S.C. 154(b) by 629 days.

(21) Appl. No.: 12/238,525

(22) Filed: Sep. 26, 2008

(65) Prior Publication Data

US 2009/0023517 A1 Jan. 22, 2009

Related U.S. Application Data

(63) Continuation-in-part of application No. 12/208,631, filed on Sep. 11, 2008, which is a continuation of application No. 11/347,456, filed on Feb. 3, 2006, now Pat. No. 7,652,086, which is a continuation-in-part of application No. 10/959,751, filed on Oct. 6, 2004, now Pat. No. 7,230,045, which is a continuation-in-part of application No. 10/360,233, filed on Feb. 6, 2003, now Pat. No. 6,939,907, which is a continuation-in-part of application No. 10/118,719, filed on Apr. 9, 2002, now Pat. No. 6,756,436.

(60) Provisional application No. 60/301,046, filed on Jun. 26, 2001.

(51) Int. Cl.
*A63B 37/06* (2006.01)
(52) U.S. Cl. ........................................ 473/373
(58) Field of Classification Search ........................ None
See application file for complete search history.

(56) References Cited

U.S. PATENT DOCUMENTS

| | | | |
|---|---|---|---|
| 4,650,193 A | 3/1987 | Molitor et al. |
| 5,273,286 A | 12/1993 | Sun |
| 5,306,760 A | 4/1994 | Sullivan |
| 5,312,857 A | 5/1994 | Sullivan |
| 5,482,285 A | 1/1996 | Yabuki et al. |
| 5,688,191 A | 11/1997 | Cavallaro et al. |
| 5,733,206 A | 3/1998 | Nesbitt et al. |
| 5,743,816 A | 4/1998 | Ohsumi et al. |
| 5,772,531 A | 6/1998 | Ohsumi et al. |
| 5,776,012 A | 7/1998 | Moriyama et al. |
| 5,783,293 A | 7/1998 | Lammi |
| 5,789,475 A | 8/1998 | Chen |
| 5,803,831 A | 9/1998 | Sullivan et al. |
| 5,810,678 A | 9/1998 | Cavallaro et al. |
| 5,816,937 A | 10/1998 | Shimosaka et al. |
| 5,885,172 A | 3/1999 | Hebert et al. |
| 5,902,855 A | 5/1999 | Sullivan |
| 5,947,842 A | 9/1999 | Cavallaro et al. |
| 5,952,415 A | 9/1999 | Hwang |
| 5,973,046 A | 10/1999 | Chen et al. |
| 6,068,561 A | 5/2000 | Renard et al. |
| 6,071,201 A | 6/2000 | Maruko |
| 6,083,119 A | 7/2000 | Sullivan et al. |
| 6,100,321 A | 8/2000 | Chen |
| 6,113,831 A | 9/2000 | Nesbitt et al. |
| 6,117,025 A | 9/2000 | Sullivan |
| 6,132,324 A | 10/2000 | Hebert et al. |
| 6,152,834 A | 11/2000 | Sullivan |
| 6,162,135 A | 12/2000 | Bulpett et al. |
| 6,180,040 B1 | 1/2001 | Ladd et al. |
| 6,210,293 B1 | 4/2001 | Sullivan |
| 6,213,895 B1 | 4/2001 | Sullivan et al. |
| 6,254,495 B1 | 7/2001 | Nakamura et al. |
| 6,284,840 B1 | 9/2001 | Rajagopalan et al. |
| 6,291,592 B1 | 9/2001 | Bulpett et al. |
| 6,299,550 B1 | 10/2001 | Molitor et al. |
| 6,309,314 B1 | 10/2001 | Sullivan et al. |
| 6,315,680 B1 | 11/2001 | Dalton et al. |
| 6,329,458 B1 | 12/2001 | Takesue et al. |
| 6,339,119 B1 | 1/2002 | Ladd et al. |
| 6,350,793 B1 | 2/2002 | Kennedy et al. |
| 6,355,715 B1 | 3/2002 | Ladd et al. |
| 6,431,998 B1 | 8/2002 | Nakamura et al. |
| 6,475,417 B2 | 11/2002 | Nesbitt et al. |
| 6,537,158 B2 | 3/2003 | Watanabe |
| 6,562,906 B2 | 5/2003 | Chen |
| 6,565,454 B2 | 5/2003 | Halko |
| 6,565,456 B2 | 5/2003 | Hayashi et al. |
| 6,583,229 B2 | 6/2003 | Mano et al. |
| 6,592,470 B2 | 7/2003 | Watanabe et al. |
| 6,605,009 B1 | 8/2003 | Nakamura et al. |
| 6,616,549 B2 | 9/2003 | Dalton et al. |
| 6,624,221 B2 | 9/2003 | Takesue et al. |
| 6,635,716 B2 | 10/2003 | Voorheis et al. |
| 6,653,382 B1 | 11/2003 | Statz et al. |
| 6,656,059 B2 | 12/2003 | Umezawa et al. |

(Continued)

FOREIGN PATENT DOCUMENTS

WO    WO 00/23519    4/2000

(Continued)

*Primary Examiner* — Robert Sellers
(74) *Attorney, Agent, or Firm* — William B. Lacy

(57) ABSTRACT

A golf ball including an inner core layer formed from a thermoset rubber composition and having a first surface hardness; a thermoplastic outer core layer having a second surface hardness, an inner surface hardness, and being formed from a copolymer of ethylene and an $\alpha,\beta$-unsaturated carboxylic acid, an organic acid or salt thereof, and sufficient cation source to fully-neutralize the acid groups of the copolymer; an inner cover layer; and an outer cover layer; wherein the first surface hardness is substantially the same as the second surface hardness and the inner surface hardness.

10 Claims, No Drawings

U.S. PATENT DOCUMENTS

| | | |
|---|---|---|
| 6,702,694 B1 | 3/2004 | Watanabe |
| 6,723,008 B2 | 4/2004 | Higuchi et al. |
| 6,746,345 B2 | 6/2004 | Higuchi et al. |
| 6,756,436 B2 | 6/2004 | Rajagopalan et al. |
| 6,783,468 B2 | 8/2004 | Sullivan et al. |
| 6,815,480 B2 | 11/2004 | Statz et al. |
| 6,837,805 B2 | 1/2005 | Binette et al. |
| 6,838,501 B2 | 1/2005 | Takesue et al. |
| 6,894,097 B2 | 5/2005 | Takesue et al. |
| 7,722,482 B2 * | 5/2010 | Sullivan et al. ............... 473/376 |
| 2001/0009310 A1 | 7/2001 | Hebert et al. |
| 2004/0082407 A1 | 4/2004 | Sullivan et al. |
| 2008/0227568 A1 * | 9/2008 | Sullivan et al. ............... 473/376 |
| 2009/0023516 A1 * | 1/2009 | Rajagopalan et al. ........ 473/373 |

FOREIGN PATENT DOCUMENTS

| | | |
|---|---|---|
| WO | WO 01/29129 A1 | 4/2001 |

* cited by examiner

THREE-LAYER-CORE GOLF BALL HAVING HIGHLY-NEUTRALIZED POLYMER OUTER CORE LAYER

CROSS-REFERENCE TO RELATED APPLICATIONS

This application continuation-in-part of co-pending U.S. patent application Ser. No. 12/208,631, filed Sep. 11, 2008, which is a continuation of U.S. patent application Ser. No. 11/347,456, filed Feb. 3, 2006, which issued as U.S. Pat. No. 7,652,086, which is a continuation-in-part of U.S. patent application Ser. No. 10/959,751, filed Oct. 6, 2004, which issued as U.S. Pat. No. 7,230,045, which is a continuation-in-part of U.S. patent application Ser. No. 10/360,233, filed Feb. 6, 2003, which issued as U.S. Pat. No. 6,939,907, which is a continuation-in-part of U.S. patent application Ser. No. 10/118,719, filed Apr. 9, 2002, which issued as U.S. Pat. No. 6,756,436, which claims priority to U.S. Provisional Patent Application No. 60/301,046, filed Jun. 26, 2001.

FIELD OF THE INVENTION

The present invention is directed to golf ball compositions and, in particular, polymer compositions including highly-neutralized polymers and blends thereof.

BACKGROUND OF THE INVENTION

Conventional golf balls can be divided into two general classes: solid and wound. Solid golf balls include one-piece, two-piece (i.e., solid core and a cover), and multi-layer (i.e., solid core of one or more layers and/or a cover of one or more layers) golf balls. Wound golf balls typically include a solid, hollow, or fluid-filled center, surrounded by a tensioned elastomeric material, and a cover. It is also possible to surround a hollow or fluid-filled center with a plurality of solid layers. Solid balls have traditionally been considered longer and more durable than wound balls, but many solid constructions lack the "feel" provided by the wound construction.

More recently, by altering ball construction and composition, manufacturers have been able to vary a wide range of playing characteristics, such as compression, velocity, "feel," and spin, optimizing each or all for various playing abilities. In particular, a variety of core and cover layer(s) constructions, such as multi-layer balls having dual cover layers and/or dual core layers, have been investigated and now allow many non-wound balls to exhibit characteristics previously maintainable in a solid-construction golf ball. These golf ball layers are typically constructed with a number of polymeric compositions and blends, including polybutadiene rubber, polyurethanes, polyamides, and ethylene-based ionomers.

Ionomers, and in particular ethylene $\alpha,\beta$-ethylenically unsaturated carboxylic acid copolymers or a melt processible ionomer thereof, are a preferred polymer for many golf ball layers. One problem encountered with the use of ionomers as stiff layers, however, is the unprocessability of the material as the percent of neutralization of the acid group increases. Ionomers are stiffened by increasing the amount of neutralization by a metal cation or a salt thereof. Once the percent of neutralization is greater than about 60% (depending on metal cation selected), the melt flow of the ionomer becomes too low and the ease of processablilty decreases or disappears altogether.

There is a need, therefore, for ionomer compositions that are neutralized at high percentages, but in a manner that still allows resultant polymer compositions to be processible. The present invention describes such compositions and there use in a variety of golf ball core and cover layers.

SUMMARY OF THE INVENTION

The present invention is directed to a golf ball comprising a center comprising a highly-neutralized thermoplastic copolymer of ethylene and an $\alpha,\beta$-unsaturated carboxylic acid, the acid being 100% neutralized by a salt of an organic acid, a cation source, or a suitable base of the organic acid; a cover; and an intermediate layer disposed between the center and the cover; wherein the golf ball has a first coefficient of restitution of 0.81 or greater when measured at an incoming velocity of 125 ft/s; and a sphere resulting from a combination of the center and the intermediate layer has a compression of 60 or greater.

The cation source is typically a metal cation of lithium, sodium, potassium, magnesium, calcium, barium, lead, tin, zinc, and aluminum. Ideally, the salt of an organic acid includes an organic acid, such as aliphatic organic acids, aromatic organic acids, saturated mono- or multi-functional organic acids, unsaturated mono- or multi-functional organic acids, and multi-unsaturated mono- or multi-functional organic acids. The salt of an organic acid may include stearic acid, behenic acid, erucic acid, oleic acid, linoelic acid or dimerized derivatives thereof. The salt of an organic acid includes a cation, such as barium, lithium, sodium, zinc, bismuth, chromium, cobalt, copper, potassium, strontium, titanium, tungsten, magnesium, cesium, iron, nickel, silver, aluminum, tin, and calcium.

The thermoplastic polymer comprises ionomeric copolymers and terpolymers, ionomer precursors, grafted metallocene-catalyzed polymers, high-crystalline acid polymers and their ionomers, or cationic ionomers. Preferably, the cover is injection molded, cast, reaction injection molded, or compression molded over the core. In one embodiment, the cover comprises an inner cover layer and an outer cover layer, at least one which comprises a polyurethane material, a polyurea material, a polyurethane-urea hybrid material, or a polyurea-urethane hybrid material.

The center typically has a diameter of 1.50 inches or less and the intermediate layer has a thickness of 0.090 inches or greater, preferably between 0.090 inches and 0.180 inches. The compression can be 80 or greater. Additionally, the golf ball should concurrently have a second coefficient of restitution of 0.76 or greater when measured at an incoming velocity of 160 ft/s.

The present invention is also directed to a golf ball comprising an innermost core, a cover, and an intermediate layer disposed between the innermost core and the cover, wherein the intermediate layer comprises a highly-neutralized thermoplastic copolymer of ethylene and an $\alpha,\beta$-unsaturated carboxylic acid, the acid being 100% neutralized by a salt of an organic acid, a cation source, or a suitable base of the organic acid, and wherein a sphere resulting from a combination of the center and the intermediate layer has a compression of 60 or greater.

The intermediate layer should have a flexural modulus of 50,000 psi or greater, preferably from 60,000 psi to 150,000 psi. In one embodiment, the center has a diameter of from 0.80 inches to 1.40 inches and a compression of 30 or less, and the intermediate layer has flexural modulus of 50,000 psi to 70,000 psi and a thickness of 0.110 inches or greater, and the cover comprises thermoset polymer having a hardness of from 45 Shore D to 60 Shore D and a thickness from 0.020 inches to 0.040 inches. Additionally, the golf ball should concurrently have a coefficient of restitution of 0.76 or greater when measured at an incoming velocity of 160 ft/s.

Additionally, the present invention is also directed to a golf ball comprising an innermost core, a cover, and an intermediate layer disposed between the innermost core and the cover, wherein the core comprises a highly-neutralized thermoplastic copolymer of ethylene and an α,β-unsaturated carboxylic acid, the acid being 100% neutralized by a salt of an organic acid, a cation source, or a suitable base of the organic acid, and wherein a sphere resulting from a combination of the center and the intermediate layer has a compression of 60 or greater.

Preferably, the compression is 80 or greater. In one embodiment, the golf ball has a coefficient of restitution of 0.80 or greater when measured at an incoming velocity of 125 ft/s. The core should have a diameter of 1.500 inches or less and/or an intermediate layer having a thickness of 0.090 inches or greater. Preferably, the intermediate layer thickness is between 0.090 inches and 0.180 inches. In an alternative embodiment, the core has a compression of 60 or less. The intermediate layer should have a flexural modulus of 50,000 psi or greater. Also, the cover can be injection molded, cast, reaction injection molded, or compression molded over the core.

The present invention is further directed to a golf ball including an inner core layer formed from a thermoset rubber composition and having a first surface hardness; a thermoplastic outer core layer having a second surface hardness, an inner surface hardness, and being formed from a copolymer of ethylene and an α,β-unsaturated carboxylic acid, an organic acid or salt thereof, and sufficient cation source to fully-neutralize the acid groups of the copolymer; an inner cover layer; and an outer cover layer. The first surface hardness is substantially the same as the second surface hardness and the inner surface hardness.

The present invention is also directed to a golf ball including an inner core layer formed from a first rubber composition and having a first surface hardness; an intermediate core layer formed from a second rubber composition; a thermoplastic outer core layer having a second surface hardness, an inner surface hardness, and including a copolymer of ethylene and an α,β-unsaturated carboxylic acid, an organic acid or salt thereof, and sufficient cation source to fully-neutralize the acid groups of the copolymer; an inner cover layer; and an outer cover layer. The first surface hardness is substantially the same as the second surface hardness and the inner surface hardness.

In one embodiment, the inner core has a diameter of 0.80 inches to 1.40 inches and a compression of 30 or less, and the outer core layer has flexural modulus of 50,000 psi to 70,000 psi and a thickness of 0.110 inches or greater, and the outer cover layer comprises castable thermoset polyurethane or polyurea having a hardness of from 45 Shore D to 60 Shore D and a thickness from 0.020 inches to 0.040 inches.

In another embodiment, a core resulting from a combination of the inner core layer, the intermediate core layer, and the thermoplastic outer core layer has a compression of 60 or greater. Preferably the core has a diameter of 1.500 inches or less and the outer core layer has a thickness of 0.090 inches or greater. The inner core has a first elastic modulus and the outer core layer has a second elastic modulus less than the first; the inner core has a first specific gravity and the outer core layer has a second specific gravity less than the first; or the inner core has a first Bashore resilience and the outer core layer has a second Bashore resilience less than the first.

DETAILED DESCRIPTION OF THE INVENTION

The present invention is directed to highly-neutralized polymers and blends thereof ("HNP") for the use in golf equipment, preferably in ball cores, intermediate layers, and/or covers. The acid moieties of the HNP's, typically ethylene-based ionomers, are preferably neutralized greater than about 70%, more preferably greater than about 90%, and most preferably at least about 100%. The HNP's can be also be blended with a second polymer component, which, if containing an acid group, may be neutralized in a conventional manner, by the organic fatty acids of the present invention, or both. The second polymer component, which may be partially or fully neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like. HNP polymers typically have a material hardness of between about 20 and about 80 Shore D, and a flexural modulus of between about 3,000 psi and about 200,000 psi.

In one embodiment of the present invention the HNP's are ionomers and/or their acid precursors that are preferably neutralized, either fully or partially, with organic acid copolymers or the salts thereof. The acid copolymers are preferably α-olefin, such as ethylene, $C_{3-8}$ α,β-ethylenically unsaturated carboxylic acid, such as acrylic and methacrylic acid, copolymers. They may optionally contain a softening monomer, such as alkyl acrylate and alkyl methacrylate, wherein the alkyl groups have from 1 to 8 carbon atoms.

The acid copolymers can be described as E/X/Y copolymers where E is ethylene, X is an α,β-ethylenically unsaturated carboxylic acid, and Y is a softening comonomer. In a preferred embodiment, X is acrylic or methacrylic acid and Y is a $C_{1-8}$ alkyl acrylate or methacrylate ester. X is preferably present in an amount from about 1 to about 35 weight percent of the polymer, more preferably from about 5 to about 30 weight percent of the polymer, and most preferably from about 10 to about 20 weight percent of the polymer. Y is preferably present in an amount from about 0 to about 50 weight percent of the polymer, more preferably from about 5 to about 25 weight percent of the polymer, and most preferably from about 10 to about 20 weight percent of the polymer.

Specific acid-containing ethylene copolymers include, but are not limited to, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include, ethylene/methacrylic acid/n-butyl acrylate, ethylene/acrylic acid/n-butyl acrylate, ethylene/methacrylic acid/methyl acrylate, ethylene/acrylic acid/ethyl acrylate, ethylene/methacrylic acid/ethyl acrylate, and ethylene/acrylic acid/methyl acrylate copolymers. The most preferred acid-containing ethylene copolymers are, ethylene/(meth) acrylic acid/n-butyl, acrylate, ethylene/(meth) acrylic acid/ethyl acrylate, and ethylene/(meth) acrylic acid/methyl acrylate copolymers.

Ionomers are typically neutralized with a metal cation, such as Li, Na, Mg, or Zn. It has been found that by adding sufficient organic acid or salt of organic acid, along with a suitable base, to the acid copolymer or ionomer, the ionomer can be neutralized without losing processability to a level much greater than for a metal cation alone. Preferably, the acid moieties are neutralized greater than about 80%, preferably from 90-100%, most preferably 100% without losing processability. This accomplished by melt-blending an ethylene α,β-ethylenically unsaturated carboxylic acid copolymer, for example, with an organic acid or a salt of organic acid, and adding a sufficient amount of a cation source to increase the level of neutralization of all the acid moieties (including those in the acid copolymer and in the organic acid) to greater than 90%, (preferably greater than 100%).

The organic acids of the present invention are aliphatic, mono- or multi-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, bebenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending).

The ionomers of the invention may also be partially neutralized with metal cations. The acid moiety in the acid copolymer is neutralized about 1 to about 100%, preferably at least about 40 to about 100%, and more preferably at least about 90 to about 100%, to form an ionomer by a cation such as lithium, sodium, potassium, magnesium, calcium, barium, lead, tin, zinc, aluminum, or a mixture thereof.

The acid copolymers of the present invention are prepared from 'direct' acid copolymers, copolymers polymerized by adding all monomers simultaneously, or by grafting of at least one acid-containing monomer onto an existing polymer. Other suitable highly-neutralized acid polymer compositions are disclosed in U.S. Patent Publication Nos. 2003/0114565 and 2005/0267240, and in U.S. patent application Ser. No. 11/270,066, which are incorporated herein, in their entirety, by reference.

Thermoplastic polymer components, such as copolyetheresters, copolyesteresters, copolyetheramides, elastomeric polyolefins, styrene diene block copolymers and their hydrogenated derivatives, copolyesteramides, thermoplastic polyurethanes, such as copolyetherurethanes, copolyesterurethanes, copolyureaurethanes, epoxy-based polyurethanes, polycaprolactone-based polyurethanes, polyureas, and polycarbonate-based polyurethanes fillers, and other ingredients, if included, can be blended in either before, during, or after the acid moieties are neutralized, thermoplastic polyurethanes.

The copolyetheresters are comprised of a multiplicity of recurring long chain units and short chain units joined head-to-tail through ester linkages, the long chain units being represented by the formula:

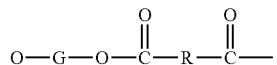

and the short chain units being represented by the formula:

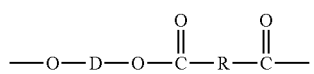

where G is a divalent radical remaining after the removal of terminal hydroxyl groups from a poly (alkylene oxide) glycol having a molecular weight of about 400-8000 and a carbon to oxygen ratio of about 2.0-4.3; R is a divalent radical remaining after removal of hydroxyl groups from a diol having a molecular weight less than about 250; provided said short chain ester units amount to about 15-95 percent by weight of said copolyetherester. The preferred copolyetherester polymers are those where the polyether segment is obtained by polymerization of tetrahydrofuran and the polyester segment is obtained by polymerization of tetramethylene glycol and phthalic acid. For purposes of the invention, the molar ether: ester ratio can vary from 90:10 to 10:80; preferably 80:20 to 60:40; and the Shore D hardness is less than 70; preferably less than about 40.

The copolyetheramides are comprised of a linear and regular chain of rigid polyamide segments and flexible polyether segments, as represented by the general formula:

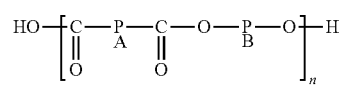

wherein PA is a linear saturated aliphatic polyamide sequence formed from a lactam or amino acid having a hydrocarbon chain containing 4 to 14 carbon atoms or from an aliphatic $C_6$-$C_8$ diamine, in the presence of a chain-limiting aliphatic carboxylic diacid having 4-20 carbon atoms; said polyamide having an average molecular weight between 300 and 15,000; and PB is a polyoxyalkylene sequence formed from linear or branched aliphatic polyoxyalkylene glycols, mixtures thereof or copolyethers derived therefrom, said polyoxyalkylene glycols having a molecular weight of less than or equal to 6000; and n indicates a sufficient number of repeating units so that said polyetheramide copolymer has an intrinsic viscosity of from about 0.6 to about 2.05. The preparation of these polyetheramides comprises the step of reacting a dicarboxylic polyamide, the COOH groups of which are located at the chain ends, with a polyoxyalkylene glycol hydroxylated at the chain ends, in the presence of a catalyst such as a tetraalkyl ortho titanate having the general formula $Ti(OR)_x$ wherein R is a linear branched aliphatic hydrocarbon radical having 1 to 24 carbon atoms. Again, the more polyether units incorporated into the copolyetheramide, the softer the polymer. The ether:amide ratios are as described above for the ether:ester ratios, as is the Shore D hardness.

The elastomeric polyolefins are polymers composed of ethylene and higher primary olefins such as propylene, hexene, octene, and optionally 1,4-hexadiene and or ethylidene norbornene or norbornadiene. The elastomeric polyolefins can be optionally functionalized with maleic anhydride, epoxy, hydroxy, amine, carboxylic acid, sulfonic acid, or thiol groups.

Thermoplastic polyurethanes are linear or slightly chain branched polymers consisting of hard blocks and soft elastomeric blocks. They are produced by reacting soft hydroxy terminated elastomeric polyethers or polyesters with diisocyanates, such as methylene diisocyanate ("MDI"), p-phenylene diisocyanate ("PPDI"), or toluene diisocyanate ("TDI"). These polymers can be chain extended with glycols, secondary diamines, diacids, or amino alcohols. The reaction products of the isocyanates and the alcohols are called urethanes and these blocks are relatively hard and high melting. These hard high melting blocks are responsible for the thermoplastic nature of the polyurethanes.

Block styrene diene copolymers and their hydrogenated derivatives are composed of polystyrene units and polydiene units. They may also be functionalized with moieties such as OH, $NH_2$, epoxy, COOH, and anhydride groups. The polydiene units are derived from polybutadiene, polyisoprene units or copolymers of these two. In the case of the copolymer it is possible to hydrogenate the polyolefin to give a saturated rubbery backbone segments. These materials are usually referred to as SBS, SIS, or SEBS thermoplastic elastomers and they can also be functionalized with maleic anhydride.

Grafted metallocene-catalyzed polymers are also useful for blending with the HNP's of the present invention. The grafted metallocene-catalyzed polymers, while conventionally neutralized with metal cations, may also be neutralized, either partially for fully, with organic acids or salts thereof and an appropriate base. Grafted metallocene-catalyzed polymers useful, such as those disclosed in U.S. Pat. Nos. 5,703, 166; 5,824,746; 5,981,658; and 6,025,442, which are incorporated herein by reference, in the golf balls of the invention are available in experimental quantities from DuPont under the tradenames SURLYN® NMO 525D, SURLYN® NMO 524D, and SURLYN® NMO 499D, all formerly known as the FUSABOND® family of polymers, or may be obtained by subjecting a non-grafted metallocene-catalyzed polymer to a post-polymerization reaction to provide a grafted metallocene-catalyzed polymer with the desired pendant group or groups. Examples of metallocene-catalyzed polymers to which functional groups may be grafted for use in the invention include, but are not limited to, homopolymers of ethylene and copolymers of ethylene and a second olefin, preferably, propylene, butene, pentene, hexene, heptene, octene, and norbornene. Generally, the invention includes golf balls having at least one layer comprising at least one grafted metallocene-catalyzed polymer or polymer blend, where the grafted metallocene-catalyzed polymer is produced by grafting a functional group onto a metallocene-catalyzed polymer having the formula:

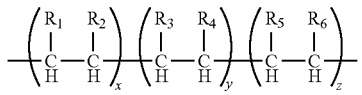

wherein $R_1$ is hydrogen, branched or straight chain alkyl such as methyl, ethyl, propyl, butyl, pentyl, hexyl, heptyl, and octyl, carbocyclic, or aromatic; $R_2$ is hydrogen, lower alkyl including $C_1$-$C_5$; carbocyclic, or aromatic; $R_3$ is hydrogen, lower alkyl including $C_1$-$C_5$, carbocyclic, or aromatic; $R_4$ is selected from the group consisting of H, $C_nH_{2n+1}$, where n=1 to 18, and phenyl, in which from 0 to 5H within $R_4$ can be replaced by substituents COOH, $SO_3H$, $NH_2$, F, Cl, Br, I, OH, SH, silicone, lower alkyl esters and lower alkyl ethers, with the proviso that $R_3$ and $R_4$ can be combined to form a bicyclic ring; $R_5$ is hydrogen, lower alkyl including $C_1$-$C_5$, carbocyclic, or aromatic; $R_6$ is hydrogen, lower alkyl including $C_1$-$C_5$, carbocyclic, or aromatic; and wherein x, y and z are the relative percentages of each co-monomer. X can range from about 1 to 99 percent or more preferably from about 10 to about 70 percent and most preferred, from about 10 to 50 percent. Y can be from 99 to 1 percent, preferably, from 90 to 30 percent, or most preferably, 90 to 50 percent. Z can range from about 0 to about 49 percent. One of ordinary skill in the art would understand that if an acid moiety is present as a ligand in the above polymer that it may be neutralized up to 100% with an organic fatty acid as described above.

Metallocene-catalyzed copolymers or terpolymers can be random or block and may be isotactic, syndiotactic, or atactic. The pendant groups creating the isotactic, syndiotactic, or atactic polymers are chosen to determine the interactions between the different polymer chains making up the resin to control the final properties of the resins used in golf ball covers, centers, or intermediate layers. As will be clear to those skilled in the art, grafted metallocene-catalyzed polymers useful in the invention that are formed from metallocene-catalyzed random or block copolymers or terpolymers will also be random or block copolymers or terpolymers, and will have the same tacticity of the metallocene-catalyzed polymer backbone.

As used herein, the term "phrase branched or straight chain alkyl" means any substituted or unsubstituted acyclic carbon-containing compounds. Examples of alkyl groups include lower alkyl, for example, methyl, ethyl, n-propyl, iso-propyl, n-butyl, iso-butyl or t-butyl; upper alkyl, for example, octyl, nonyl, decyl, and the like; and lower alkylene, for example, ethylene, propylene, butylene, pentene, hexene, octene, norbornene, nonene, decene, and the like.

In addition, such alkyl groups may also contain various substituents in which one or more hydrogen atoms has been replaced by a functional group. Functional groups include, but are not limited to hydroxyl, amino, carboxyl, sulfonic amide, ester, ether, phosphates, thiol, nitro, silane and halogen (fluorine, chlorine, bromine and iodine), to mention but a few.

As used herein, the term "substituted and unsubstituted carbocyclic" means cyclic carbon-containing compounds, including, but not limited to cyclopentyl, cyclohexyl, cycloheptyl, and the like. Such cyclic groups may also contain various substituents in which one or more hydrogen atoms has been replaced by a functional group. Such functional groups include those described above, and lower alkyl groups having from 1-28 carbon atoms. The cyclic groups of the invention may further comprise a heteroatom.

As mentioned above, $R_1$ and $R_2$ can also represent any combination of alkyl, carbocyclic or aryl groups, for example, 1-cyclohexylpropyl, benzyl cyclohexylmethyl, 2-cyclohexylpropyl, 2,2-methylcyclohexylpropyl, 2,2-methylphenylpropyl, and 2,2-methylphenylbutyl.

Non-grafted metallocene-catalyzed polymers useful in the present invention are commercially available under the trade name AFFINITY® polyolefin plastomers and ENGAGE® polyolefin elastomers commercially available from Dow Chemical Company and DuPont-Dow. Other commercially available metallocene-catalyzed polymers can be used, such as EXACT®, commercially available from Exxon and INSIGHT®, commercially available from Dow. The EXACT® and INSIGHT® line of polymers also have novel Theological behavior in addition to their other properties as a result of using a metallocene catalyst technology. Metallocene-catalyzed polymers are also readily available from Sentinel Products Corporation of Hyannis, Mass., as foamed sheets for compression molding.

Monomers useful in the present invention include, but are not limited to, olefinic monomers having, as a functional group, sulfonic acid, sulfonic acid derivatives, such as chlorosulfonic acid, vinyl ethers, vinyl esters, primary, secondary, and tertiary amines, mono-carboxylic acids, dicarboxylic acids, partially or fully ester-derivatized mono-carboxylic and dicarboxylic acids, anhydrides of dicarboxylic acids, and cyclic imides of dicarboxylic acids.

In addition, metallocene-catalyzed polymers may also be functionalized by sulfonation, carboxylation, or the addition of an amine or hydroxy group. Metallocene-catalyzed polymers functionalized by sulfonation, carboxylation, or the addition of a hydroxy group may be converted to anionic ionomers by treatment with a base. Similarly, metallocene-catalyzed polymers functionalized by the addition of an amine may be converted to cationic ionomers by treatment with an alkyl halide, acid, or acid derivative.

The most preferred monomer is maleic anhydride, which, once attached to the metallocene-catalyzed polymer by the post-polymerization reaction, may be further subjected to a reaction to form a grafted metallocene-catalyzed polymer containing other pendant or functional groups. For example, reaction with water will convert the anhydride to a dicarboxylic acid; reaction with ammonia, alkyl, or aromatic amine forms an amide; reaction with an alcohol results in the formation of an ester; and reaction with base results in the formation of an anionic ionomer.

The HNP's of the present invention may also be blended with single-site and metallocene catalysts and polymers formed therefrom. As used herein, the term "single-site catalyst," such as those disclosed in U.S. Pat. No. 6,150,462 which is incorporated herein by reference, refers to a catalyst that contains an ancillary ligand that influences the stearic and electronic characteristics of the polymerizing site in a manner that prevents formation of secondary polymerizing species. The term "metallocene catalyst" refers to a single-site catalyst wherein the ancillary ligands are comprising substituted or unsubstituted cyclopentadienyl groups, and the term "non-metallocene catalyst" refers to a single-site catalyst other than a metallocene catalyst.

Non-metallocene single-site catalysts include, but are not limited to, the Brookhart catalyst, which has the following structure:

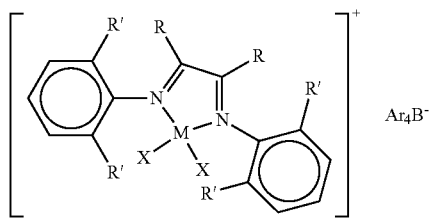

wherein M is nickel or palladium; R and R' are independently hydrogen, hydrocarbyl, or substituted hydrocarbyl; Ar is $(CF_3)_2C_6H_3$, and X is alkyl, methyl, hydride, or halide; the McConville catalyst, which has the structure:

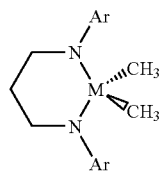

wherein M is titanium or zirconium. Iron (II) and cobalt (II) complexes with 2,6-bis(imino) pyridyl ligands, which have the structure:

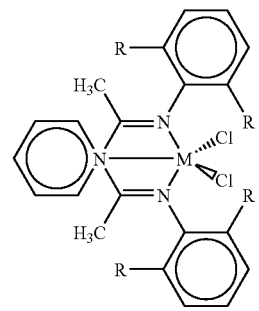

where M is the metal, and R is hydrogen, alkyl, or hydrocarbyl. Titanium or zirconium complexes with pyrroles as ligands also serve as single-site catalysts. These complexes have the structure:

where M is the metal atom; m and n are independently 1 to 4, and indicate the number of substituent groups attached to the aromatic rings; $R_m$ and $R_n$ are independently hydrogen or alkyl; and X is halide or alkyl. Other examples include diimide complexes of nickel and palladium, which have the structure:

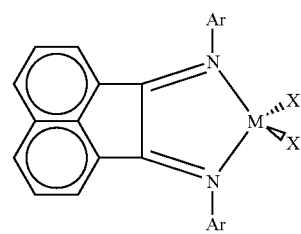

where Ar is aromatic, M is the metal, and X is halide or alkyl. Boratabenzene complexes of the Group IV or V metals also function as single-site catalysts. These complexes have the structure:

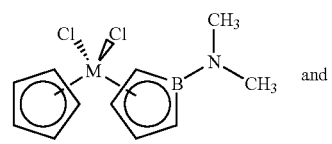

and

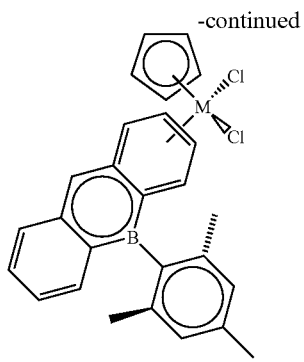

where B is boron and M is the metal atom.

As used herein, the term "single-site catalyzed polymer" refers to any polymer, copolymer, or terpolymer, and, in particular, any polyolefin polymerized using a single-site catalyst. The term "non-metallocene single-site catalyzed polymer" refers to any polymer, copolymer, or terpolymer, and, in particular, any polyolefin polymerized using a single-site catalyst other than a metallocene-catalyst. The catalysts discussed above are examples of non-metallocene single-site catalysts. The term "metallocene catalyzed polymer" refers to any polymer, copolymer, or terpolymer, and, in particular, any polyolefin, polymerized using a metallocene catalyst.

As used herein, the term "single-site catalyzed polymer blend" refers to any blend of a single-site catalyzed polymer and any other type of polymer, preferably an ionomer, as well as any blend of a single-site catalyzed polymer with another single-site catalyzed polymer, including, but not limited to, a metallocene-catalyzed polymer.

The terms "grafted single-site catalyzed polymer" and "grafted single-site catalyzed polymer blend" refer to any single-site catalyzed polymer or single-site catalyzed polymer blend in which the single-site catalyzed polymer has been subjected to a post-polymerization reaction to graft at least one functional group onto the single-site catalyzed polymer. A "post-polymerization reaction" is any reaction that occurs after the formation of the polymer by a polymerization reaction.

The single-site catalyzed polymer, which may be grafted, may also be blended with polymers, such as non-grafted single-site catalyzed polymers, grafted single-site catalyzed polymers, ionomers, and thermoplastic elastomers. Preferably, the single-site catalyzed polymer is blended with at least one ionomer of the preset invention.

Grafted single-site catalyzed polymers useful in the golf balls of the invention may be obtained by subjecting a non-grafted single-site catalyzed polymer to a post-polymerization reaction to provide a grafted single-site catalyzed polymer with the desired pendant group or groups. Examples of single-site catalyzed polymers to which functional groups may be grafted for use in the invention include, but are not limited to, homopolymers of ethylene and propylene and copolymers of ethylene and a second olefin, preferably, propylene, butene, pentene, hexene, heptene, octene, and norbornene. Monomers useful in the present invention include, but are not limited to olefinic monomers having as a functional group sulfonic acid, sulfonic acid derivatives, such as chlorosulfonic acid, vinyl ethers, vinyl esters, primary, secondary, and tertiary amines, epoxies, isocyanates, mono-carboxylic acids, dicarboxylic acids, partially or fully ester derivatized mono-carboxylic and dicarboxylic acids, anhydrides of dicarboxylic acids, and cyclic imides of dicarboxylic acids. Generally, this embodiment of the invention includes golf balls having at least one layer comprising at least one grafted single-site catalyzed polymer or polymer blend, where the grafted single-site catalyzed polymer is produced by grafting a functional group onto a single-site catalyzed polymer having the formula:

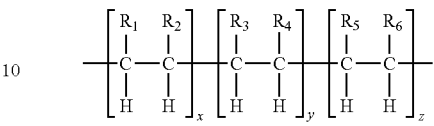

where $R_1$ is hydrogen, branched or straight chain alkyl such as methyl, ethyl, propyl, butyl, pentyl, hexyl, heptyl, and octyl, carbocyclic, aromatic or heterocyclic; $R_2$, $R_3$, $R_5$, and $R_6$ are hydrogen, lower alkyl including $C_1$-$C_5$, carbocyclic, aromatic or heterocyclic; $R_4$ is H, $C_nH_{2n+1}$, where n=1 to 18, and phenyl, in which from 0 to 5H within $R_4$ can be replaced by substituents such as COOH, $SO_3H$, $NH_2$, F, Cl, Br, I, OH, SH, epoxy, isocyanate, silicone, lower alkyl esters and lower alkyl ethers; also, $R_3$ and $R_4$ can be combined to form a bicyclic ring; and x, y and z are the relative percentages of each co-monomer. X can range from about 1 to about 100 percent or more preferably from 1 to 70 percent and most preferred, from about 1 to about 50 percent. Y can be from about 99 to about 0 percent, preferably, from about 9 to about 30 percent, or most preferably, about 9 to about 50 percent. Z can range from about 0 to about 50 percent. One of ordinary skill in the art would also understand that if an acid group is selected as a ligand in the above structure that it too could be neutralized with the organic fatty acids described above.

The HNP's of the present invention may also be blended with high crystalline acid copolymers and their ionomer derivatives (which may be neutralized with conventional metal cations or the organic fatty acids and salts thereof) or a blend of a high crystalline acid copolymer and its ionomer derivatives and at least one additional material, preferably an acid copolymer and its ionomer derivatives. As used herein, the term "high crystalline acid copolymer" is defined as a "product-by-process" in which an acid copolymer or its ionomer derivatives formed from a ethylene/carboxylic acid copolymer comprising about 5 to about 35 percent by weight acrylic or methacrylic acid, wherein the copolymer is polymerized at a temperature of about 130° C. to 200° C., at pressures greater than about 20,000 psi preferably greater than about 25,000 psi, more pref. from about 25,000 psi to about 50,000 psi, wherein up to about 70 percent, preferably 100 percent, of the acid groups are neutralized with a metal ion, organic fatty acids and salts thereof, or a mixture thereof. The copolymer can have a melt index ("MI") of from about 20 to about 300 g/10 min, preferably about 20 to about 200 g/10 min, and upon neutralization of the copolymer, the resulting acid copolymer and its ionomer derivatives should have an MI of from about 0.1 to about 30.0 g/10 min.

Suitable high crystalline acid copolymer and its ionomer derivatives compositions and methods for making them are disclosed in U.S. Pat. No. 5,580,927, the disclosure of which is hereby incorporated by reference in its entirety.

The high crystalline acid copolymer or its ionomer derivatives employed in the present invention are preferably formed from a copolymer containing about 5 to about 35 percent, more preferably from about 9 to about 18, most preferably about 10 to about 13 percent, by weight of acrylic acid, wherein up to about 75 percent, most preferably about 60 percent, of the acid groups are neutralized with an organic fatty acid, salt thereof, or a metal ion, such as sodium, lithium, magnesium, or zinc ion.

Generally speaking, high crystalline acid copolymer and its ionomer derivatives are formed by polymerization of their base copolymers at lower temperatures, but at equivalent pressures to those used for forming a conventional acid copolymer and its ionomer derivatives. Conventional acid copolymers are typically polymerized at a polymerization temperature of from at least about 200° C. to about 270° C., preferably about 220° C., and at pressures of from about 23,000 to about 30,000 psi. In comparison, the high crystalline acid copolymer and its ionomer derivatives employed in the present invention are produced from acid copolymers that are polymerized at a polymerization temperature of less than 200° C., and preferably from about 130° C. to about 200° C., and at pressures from about 20,000 to about 50,000 psi.

The HNP's of the present invention may also be blended with cationic ionomers, such as those disclosed in U.S. Pat. No. 6,193,619 which is incorporated herein by reference. In particular, cationic ionomers have a structure according to the formula:

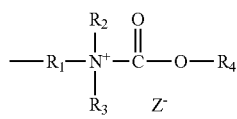

or the formula:

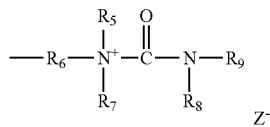

wherein $R_1$-$R_9$ are organic moieties of linear or branched chain alkyl, carbocyclic, or aryl; and Z is the negatively charged conjugate ion produced following alkylation and/or quaternization. The cationic polymers may also be quarternized up to 100% by the organic fatty acids described above.

In addition, such alkyl group may also contain various substituents in which one or more hydrogen atoms has been replaced by a functional group. Functional groups include but are not limited to hydroxyl, amino, carboxyl, amide, ester, ether, sulfonic, siloxane, siloxyl, silanes, sulfonyl, and halogen.

As used herein, substituted and unsubstituted carbocyclic groups of up to about 20 carbon atoms means cyclic carbon-containing compounds, including but not limited to cyclopentyl, cyclohexyl, cycloheptyl, and the like. Such cyclic groups may also contain various substituents in which one or more hydrogen atoms has been replaced by a functional group. Such functional groups include those described above, and lower alkyl groups as described above. The cyclic groups of the invention may further comprise a heteroatom.

The HNP's of the present invention may also be blended with polyurethane and polyurea ionomers which include anionic moieties or groups, such as those disclosed in U.S. Pat. No. 6,207,784 which is incorporated herein by reference. Typically, such groups are incorporated onto the diisocyanate or diisocyanate component of the polyurethane or polyurea ionomers. The anionic group can also be attached to the polyol or amine component of the polyurethane or polyurea, respectively. Preferably, the anionic group is based on a sulfonic, carboxylic or phosphoric acid group. Also, more than one type of anionic group can be incorporated into the polyurethane or polyurea. Examples of anionic polyurethane ionomers with anionic groups attached to the diisocyanate moiety can have a chemical structure according to the following formula:

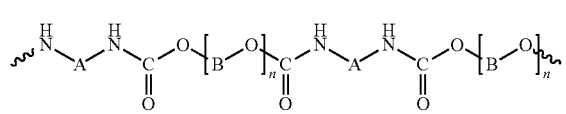

where $A=R-Z^-M^{+x}$; R is a straight chain or branched aliphatic group, a substituted straight chain or branched aliphatic group, or an aromatic or substituted aromatic group; $Z=SO_3^-$, $CO_2^-$ or $HPO_3^-$; M is a group IA, IB, IIA, IIB, IIIA, IIIB, IVA, IVB, VA, VB, VIIA, VIIB, VIIB or VIIIB metal; x=1 to 5; B is a straight chain or branched aliphatic group, a substituted straight chain or branched aliphatic group, or an aromatic or substituted aromatic group; and n=1 to 100. Preferably, $M^{+x}$ is one of the following: $Li^+$, $Na^+$, $K^+$, $Mg^+$, $Zn^{+2}$, $Ca^{+2}$, $Mn^{+2}$, $Al^{+3}$, $Ti^{+x}$, $Zr^{+x}$, $W^{+x}$ or $Hf^{+x}$.

Exemplary anionic polyurethane ionomers with anionic groups attached to the polyol component of the polyurethane are characterized by the above chemical structure where A is a straight chain or branched aliphatic group, a substituted straight chain or branched aliphatic group, or an aromatic or substituted aromatic group; $B=R-Z^-M^{+x}$; R is a straight chain or branched aliphatic group, a substituted straight chain or branched aliphatic group, or an aromatic or substituted aromatic group; $Z=SO_3^-$, $CO_2^-$ or $HPO_3^-$; M is a group IA, IB, IIA, IIB, IIIA, IIIB, IVA, IVB, VA, VB, VIIA, VIIB, VIIB or VIIIB metal; x=1 to 5; and n=1 to 100. Preferably, $M^{+x}$ is one of the following: $Li^+$, $Na^+$, $K^+$, $Mg^+2$, $Zn^{+2}$, $Ca^{+2}$, $Mn^{+2}$, $Al^{+3}$, $Ti^{+x}$, $Zr^{+x}$, $W^{+x}$ or $Hf^{+x}$.

Examples of suitable anionic polyurea ionomers with anionic groups attached to the diisocyanate component have a chemical structure according to the following chemical structure:

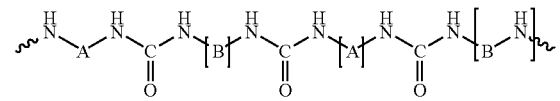

where $A=R-Z^-M^{+x}$; R is a straight chain or branched aliphatic group, a substituted straight chain or branched aliphatic group, or an aromatic or substituted aromatic group; $Z=SO_3^-$, $CO_2^-$ or $HPO_3^-$; M is a group IA, IB, IIA, IIB, IIIA, IIIB, IVA, IVB, VA, VB, VIIA, VIIB, VIIB or VIIIB metal; x=1 to 5; and B is a straight chain or branched aliphatic group, a substituted straight chain or branched aliphatic group, or an aromatic or substituted aromatic group. Preferably, $M^{+x}$ is one of the following: $Li^+$, $Na^+$, $K^+$, $Mg^{+2}$, $Zn^{+2}$, $Ca^{+2}$, $Mn^{+2}$, $Al^{+3}$, $Ti^{+x}$, $Zr^{+x}$, $W^{+x}$, or $Hf^{+x}$.

Suitable anionic polyurea ionomers with anionic groups attached to the amine component of the polyurea are characterized by the above chemical structure where A is a straight chain or branched aliphatic group, a substituted straight chain or branched aliphatic group, or an aromatic or substituted aromatic group; $B=R-Z-M^{+x}$; R is a straight chain or branched aliphatic group, a substituted straight chain or branched aliphatic group, or an aromatic or substituted aromatic group; $Z=SO_3^-$, $CO_2^-$, or $HPO_3^-$; M is a group IA, IB, IIA, IIB, IIIA, IIIB, IVA, IVB, VA, VB, VIIA, VIIB, VIIB or VIIIB metal; and x=1 to 5. Preferably, $M^{+x}$ is one of the following: $Li^+$, $Na^+$, $K^+$, $Mg^+$, $Zn^+$, $Ca^{+2}$, $Mn^{+2}$, $Al^{+3}$, $Ti^{+x}$, $Zr^{+x}$, $W^{+x}$, or $Hf^{+x}$. The anionic polyurethane and polyurea ionomers may also be neutralized up to 100% by the organic fatty acids described above.

The anionic polymers useful in the present invention, such as those disclosed in U.S. Pat. No. 6,221,960 which is incorporated herein by reference, include any homopolymer, copolymer or terpolymer having neutralizable hydroxyl and/or dealkylable ether groups, and in which at least a portion of the neutralizable or dealkylable groups are neutralized or dealkylated with a metal ion.

As used herein "neutralizable" or "dealkylable" groups refer to a hydroxyl or ether group pendent from the polymer chain and capable of being neutralized or dealkylated by a metal ion, preferably a metal ion base. These neutralized polymers have improved properties critical to golf ball performance, such as resiliency, impact strength and toughness and abrasion resistance. Suitable metal bases are ionic compounds comprising a metal cation and a basic anion. Examples of such bases include hydroxides, carbonates, acetates, oxides, sulfides, and the like.

The particular base to be used depends upon the nature of the hydroxyl or ether compound to be neutralized or dealkylated, and is readily determined by one skilled in the art. Preferred anionic bases include hydroxides, carbonates, oxides and acetates.

The metal ion can be any metal ion which forms an ionic compound with the anionic base. The metal is not particularly limited, and includes alkali metals, preferably lithium, sodium or potassium; alkaline earth metals, preferably magnesium or calcium; transition metals, preferably titanium, zirconium, or zinc; and Group III and IV metals. The metal ion can have a +1 to +5 charge. Most preferably, the metal is lithium, sodium, potassium, zinc, magnesium, titanium, tungsten, or calcium, and the base is hydroxide, carbonate or acetate.

The anionic polymers useful in the present invention include those which contain neutralizable hydroxyl and/or dealkylable ether groups. Exemplary polymers include ethylene vinyl alcohol copolymers, polyvinyl alcohol, polyvinyl acetate, poly(p-hydroxymethylene styrene), and p-methoxy styrene, to name but a few. It will be apparent to one skilled in the art that many such polymers exist and thus can be used in the compositions of the invention. In general, the anionic polymer can be described by the chemical structure:

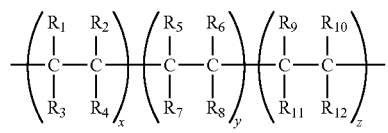

where $R_1$ is OH, $OC(O)R^a$, $O-M^{+V}$, $(CH_2)_n R_b$, $(CHR_z)_n R_b$, or aryl, wherein n is at least 1, $R_a$ is a lower alkyl, M is a metal ion, V is an integer from 1 to 5, $R_b$ is OH, $OC(O)R_a$, $O-M^{+V}$, and $R_z$ is a lower alkyl or aryl, and $R_2$, $R_3$ and $R_4$ are each independently hydrogen, straight-chain or branched-chain lower alkyl. $R_2$, $R_3$ and $R_4$ may also be similarly substituted. Preferably n is from 1 to 12, more preferably 1 to 4.

The term "substituted," as used herein, means one or more hydrogen atoms has been replaced by a functional group. Functional groups include, but are not limited to, hydroxyl, amino, carboxyl, sulfonic, amide, ether, ether, phosphates, thiol, nitro, silane, and halogen, as well as many others which are quite familiar to those of ordinary skill in this art.

The terms "alkyl" or "lower alkyl," as used herein, includes a group of from about 1 to 30 carbon atoms, preferably 1 to 10 carbon atoms.

In the anionic polymers useful in the present invention, at least a portion of the neutralizable or dealkylable groups of $R_1$ are neutralized or dealkylated by an organic fatty acid, a salt thereof, a metal base, or a mixture thereof to form the corresponding anionic moiety. The portion of the neutralizable or dealkylable groups which are neutralized or dealkylated can be between about 1 to about 100 weight percent, preferably between about 50 to about 100 weight percent, more preferably before about 90 to about 100.

Neutralization or dealkylation may be performed by melting the polymer first, then adding a metal ion in an extruder. The degree of neutralization or dealkylation is controlled by varying the amount of metal ion added. Any method of neutralization or dealkylation available to those of ordinary skill in the art may also be suitably employed.

In one embodiment, the anionic polymer is repeating units any one of the three homopolymer units in the chemical structure above. In a preferred embodiment, $R_2$, $R_3$ and $R_4$ are hydrogen, and $R_1$ is hydroxyl, i.e., the anionic polymer is a polyvinyl alcohol homopolymer in which a portion of the hydroxyl groups have been neutralized with a metal base. In another preferred embodiment, $R_2$, $R_3$ and $R_4$ are hydrogen, $R_1$ is $OC(O)R^a$, and $R_a$ is methyl, i.e., the anionic polymer is a polyvinyl acetate homopolymer in which a portion of the methyl ether groups have been dealkylated with a metal ion.

The anionic polymer can also be a copolymer of two different repeating units having different substituents, or a terpolymer of three different repeating units described in the above formula. In this embodiment, the polymer can be a random copolymer, an alternating copolymer, or a block copolymer, where the term "copolymer" includes terpolymers.

In another embodiment, the anionic polymer is a copolymer, wherein $R_5$, $R_6$, $R_7$ and $R_8$ are each independently selected from the group defined above for $R_2$. The first unit of the copolymer can comprise from about 1 to 99 percent weight percent of the polymer, preferably from about 5 to 50 weight percent, and the second unit of the copolymer can comprise from about 99 to 1 weight percent, preferably from about 95 to 50 weight percent. In one preferred embodiment, the anionic polymer is a random, alternating or block copolymer of units (Ia) and (Ib) wherein $R_1$ is hydroxyl, and each of the remaining R groups is hydrogen, i.e., the polymer is a copolymer of ethylene and vinyl alcohol. In another preferred embodiment, the anionic polymer is a random, alternating or block copolymer of units (Ia) and (Ib) wherein $R_1$ is OC(O)$R_5$, where $R_5$ is methyl, and each of the remaining R groups is hydrogen, i.e., the polymer is a copolymer of ethylene and vinyl acetate.

In another embodiment, the anionic polymer is an anionic polymer having neutralizable hydroxyl and/or dealkylable ether groups of as in the above chemical structure wherein $R_{1-9}$ and $R_b$ and $R_z$ are as defined above; $R_{10-11}$ are each independently selected from the group as defined above for $R_2$; and $R_{12}$ is OH or $OC(O)R_{13}$, where $R_{13}$ is a lower alkyl; wherein x, y and z indicate relative weight percent of the different units. X can be from about 99 to about 50 weight percent of the polymer, y can be from about 1 to about 50 weight percent of the polymer, and z ranges from about 0 to about 50 weight percent of the polymer. At least a portion of the neutralizable groups $R_1$ are neutralized. When the amount of z is greater than zero, a portion of the groups $R_{10}$ can also be fully or partially neutralized, as desired.

In particular, the anionic polymers and blends thereof can comprise compatible blends of anionic polymers and ionomers, such as the ionomers described above, and ethylene acrylic methacrylic acid ionomers, and their terpolymers, sold commercially under the trade names SURLYN® and IOTEK® by DuPont and Exxon respectively. The anionic polymer blends useful in the golf balls of the invention can also include other polymers, such as polyvinylalcohol, copolymers of ethylene and vinyl alcohol, poly(ethylethylene), poly(heptylethylene), poly(hexyldecylethylene), poly(isopentylethylene), poly(butyl acrylate), acrylate), poly(2-ethylbutyl acrylate), poly(heptyl acrylate), poly(2-methylbutyl acrylate), poly(3-methylbutyl acrylate), poly(N-octadecylacrylamide), poly(octadecyl methacrylate), poly(butoxyethylene), poly(methoxyethylene), poly(pentyloxyethylene), poly(1,1-dichloroethylene), poly(4-[(2-butoxyethoxy)methyl]styrene), poly[oxy(ethoxymethyl)ethylene], poly(oxyethylethylene), poly(oxytetramethylene), poly(oxytrimethylene), poly(silanes) and poly(silazanes), polyamides, polycarbonates, polyesters, styrene block copolymers, polyetheramides, polyurethanes, main-chain heterocyclic polymers and poly(furan tetracarboxylic acid diimides), as well as the classes of polymers to which they belong.

The anionic polymer compositions of the present invention typically have a flexural modulus of from about 500 psi to about 300,000 psi, preferably from about 2000 to about 200,000 psi. The anionic polymer compositions typically have a material hardness of at least about 15 Shore A, preferably between about 30 Shore A and 80 Shore D, more preferably between about 50 Shore A and 60 Shore D. The loss tangent, or dissipation factor, is a ratio of the loss modulus over the dynamic shear storage modulus, and is typically less than about 1, preferably less than about 0.01, and more preferably less than about 0.001 for the anionic polymer compositions measured at about 23° C. The specific gravity is typically greater than about 0.7, preferably greater than about 1, for the anionic polymer compositions. The dynamic shear storage modulus, or storage modulus, of the anionic polymer compositions at about 23° C. is typically at least about 10,000 dyn/cm$^2$.

The golf balls of the present invention may comprise a variety of constructions. In one embodiment of the present invention, golf ball includes a core, an inner cover layer surrounding the core, and an outer cover layer. Preferably, the core is solid. More preferably, the core is a solid, single-layer core. In a preferred embodiment, the solid core comprises the HNP's of the present invention. In an alternative embodiment, the solid core may include compositions having a base rubber, a crosslinking agent, a filler, and a co-crosslinking or initiator agent, and the inner cover layer comprises the HNP's of the present invention.

The base rubber typically includes natural or synthetic rubbers. A preferred base rubber is 1,4-polybutadiene having a cis-structure of at least 40%. More preferably, the base rubber comprises high-Mooney-viscosity rubber. If desired, the polybutadiene can also be mixed with other elastomers known in the art such as natural rubber, polyisoprene rubber and/or styrene-butadiene rubber in order to modify the properties of the core.

The crosslinking agent includes a metal salt of an unsaturated fatty acid such as a zinc salt or a magnesium salt of an unsaturated fatty acid having 3 to 8 carbon atoms such as acrylic or methacrylic acid. Suitable cross linking agents include metal salt diacrylates, dimethacrylates and monomethacrylates wherein the metal is magnesium, calcium, zinc, aluminum, sodium, lithium or nickel. The crosslinking agent is present in an amount from about 15 to about 40 parts per hundred of the rubber, preferably in an amount from about 19 to about 25 parts per hundred of the rubber and most preferably having about 20 to 24 parts crosslinking agent per hundred of rubber. The core compositions of the present invention may also include at least one organic or inorganic cis-trans catalyst to convert a portion of the cis-isomer of polybutadiene to the trans-isomer, as desired.

The initiator agent can be any known polymerization initiator which decomposes during the cure cycle. Suitable initiators include peroxide compounds such as dicumyl peroxide, 1,1-di-(t-butylperoxy) 3,3,5-trimethyl cyclohexane, a-a bis-(t-butylperoxy) diisopropylbenzene, 2,5-dimethyl-2,5 di-(t-butylperoxy) hexane or di-t-butyl peroxide and mixtures thereof.

Fillers, any compound or composition that can be used to vary the density and other properties of the core, typically include materials such as tungsten, zinc oxide, barium sulfate, silica, calcium carbonate, zinc carbonate, metals, metal oxides and salts, regrind (recycled core material typically ground to about 30 mesh particle), high-Mooney-viscosity rubber regrind, and the like.

The HNP compositions of the present invention may also be moisture resistant. For purposes of the present disclosure, a composition is "moisture resistant" if it has a moisture vapor transmission rate ("MVTR") of 12.5 gmil/100 in$^2$/day or less. Preferably, the moisture resistant compositions of the present invention have an MVTR of 8.0 gmil/100 in$^2$/day or less, or 6.5 gmil/100 in$^2$/day or less, or 5.0 gmil/100 in$^2$/day or less, or 4.0 gmil/100 in$^2$/day or less, or 2.5 gmil/100 in$^2$/day or less, or 2.0 gmil/100 in$^2$/day or less. As used herein, moisture vapor transmission rate (MVTR) is given in gmil/100 in$^2$/day, and is measured at 20° C., and according to ASTM F1249-99.

In a particular embodiment, the cation source is selected from metal ions and compounds of calcium, metal ions and compounds of zinc, and combinations thereof. In a particular aspect of this embodiment, the equivalent percentage of calcium and/or zinc salt(s) in the final composition is 50% or higher, or 60% or higher, or 70% or higher, or 80% or higher, or 90% or higher, based on the total salts present in the final composition, wherein the equivalent % is determined by multiplying the mol % of the cation by the valence of the cation. In another particular embodiment, the cation source is selected from metal ions and compounds of lithium, sodium, potassium, magnesium, calcium, zinc, and combinations thereof. In another particular embodiment, the cation source is selected from metal ions and compounds of lithium, metal ions and compounds of zinc, and combinations thereof. Suitable cation sources also include mixtures of lithium and/or zinc cations with other cations. Other cations suitable for mixing with lithium and/or zinc cations to produce the HNP include, but are not limited to, the "less hydrophilic" cations disclosed in U.S. Patent Application Publication No. 2006/0106175; conventional HNP cations, such as those disclosed in U.S. Pat. Nos. 6,756,436 and 6,824,477; and the cations disclosed in U.S. Patent Application Publication No. 2005/0267240. The entire disclosure of each of these references is hereby incorporated herein by reference. In a particular aspect of this embodiment, the percentage of lithium and/or zinc salts in the composition is preferably 50% or higher, or 55% or higher, or 60% or higher, or 65% or higher, or 70% or higher, or 80% or higher, or 90% or higher, or 95% or higher, or 100%, based on the total salts present in the composition.

The amount of cation source used is readily determined based on the desired level of neutralization.

The golf ball cores of the present invention may also comprise a variety of constructions. For example, the core may comprise a single layer or a plurality of layers. The core may also comprise a layer of tensioned elastomeric material. In another embodiment of the present invention, golf ball comprises a solid center surrounded by at least one additional solid outer core layer. The "dual" core is surrounded by a "double" cover comprising an inner cover layer and an outer cover layer.

Preferably, the solid center comprises the HNP's of the present invention. In another embodiment, the inner cover layer comprises the highly-neutralized acid copolymers of the present invention. In an alternative embodiment, the outer core layer comprises the highly-neutralized acid copolymers of the present invention.

At least one of the outer core layers is formed of a resilient rubber-based component comprising a high-Mooney-viscosity rubber, and a crosslinking agent present in an amount from about 20 to about 40 parts per hundred, from about 30 to about 38 parts per hundred, and most preferably about 37 parts per hundred. It should be understood that the term "parts per hundred" is with reference to the rubber by weight.

When the golf ball of the present invention includes an intermediate layer, such as an outer core layer or an inner cover layer, any or all of these layer(s) may comprise thermoplastic and thermosetting material, but preferably the intermediate layer(s), if present, comprise any suitable material, such as ionic copolymers of ethylene and an unsaturated monocarboxylic acid which are available under the trademark SURLYN® of E.I. DuPont de Nemours & Co., of Wilmington, Del., or IOTEK® or ESCOR® of Exxon. These are copolymers or terpolymers of ethylene and methacrylic acid or acrylic acid partially neutralized with salts of zinc, sodium, lithium, magnesium, potassium, calcium, manganese, nickel or the like, in which the salts are the reaction product of an olefin having from 2 to 8 carbon atoms and an unsaturated monocarboxylic acid having 3 to 8 carbon atoms. The carboxylic acid groups of the copolymer may be totally or partially neutralized and might include methacrylic, crotonic, maleic, fumaric or itaconic acid.

This golf ball can likewise include one or more homopolymeric or copolymeric inner cover materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst;

(3) Polyurethanes, such as those prepared from polyols and diisocyanates or polyisocyanates, in particular PPDI-based thermoplastic polyurethanes, and those disclosed in U.S. Pat. No. 5,334,673;

(4) Polyureas, such as those disclosed in U.S. Pat. No. 5,484,870;

(5) Polyamides, such as poly(hexamethylene adipamide) and others prepared from diamines and dibasic acids, as well as those from amino acids such as poly(caprolactam), and blends of polyamides with SURLYN®, polyethylene, ethylene copolymers, ethylene-propylene-non-conjugated diene terpolymer, and the like;

(6) Acrylic resins and blends of these resins with poly vinyl chloride, elastomers, and the like;

(7) Thermoplastics, such as urethane; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX®, sold by ELF Atochem of Philadelphia, Pa.;

(8) Polyphenylene oxide resins or blends of polyphenylene oxide with high impact polystyrene as sold under the trademark NORYL® by General Electric Company of Pittsfield, Mass.;

(9) Thermoplastic polyesters, such as polyethylene terephthalate, polybutylene terephthalate, polyethylene terephthalate/glycol modified, poly(trimethylene tereptphalate), and elastomers sold under the trademarks HYTREL® by E.I. DuPont de Nemours & Co. of Wilmington, Del., and LOMOD® by General Electric Company of Pittsfield, Mass.;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

Preferably, the inner cover includes polymers, such as ethylene, propylene, butene-1 or hexane-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(vinyl alcohol), poly(tetrafluoroethylene) and their copolymers including functional comonomers, and blends thereof. Suitable cover compositions also include a polyether or polyester thermoplastic urethane, a thermoset polyurethane, a low modulus ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. More preferably, in a low spin rate embodiment designed for maximum distance, the acrylic or methacrylic acid is present in about 16 to 35 weight percent, making the ionomer a high modulus ionomer. In a higher spin embodiment, the inner cover layer includes an ionomer where an acid is present in about 10 to 15 weight percent and includes a softening comonomer. Additionally, high-density polyethylene ("HDPE"), low-density polyethylene ("LDPE"), LLDPE, and homo- and co-polymers of polyolefin are suitable for a variety of golf ball layers.

In one embodiment, the outer cover preferably includes a polyurethane composition comprising the reaction product of at least one polyisocyanate, polyol, and at least one curing agent. Any polyisocyanate available to one of ordinary skill in the art is suitable for use according to the invention. Exemplary polyisocyanates include, but are not limited to, 4,4'-diphenylmethane diisocyanate ("MDI"); polymeric MDI; carbodiimide-modified liquid MDI; 4,4'-dicyclohexylmethane diisocyanate ("$H_{12}$MDI"); p-phenylene diisocyanate ("PPDI"); m-phenylene diisocyanate ("MPDI"); toluene diisocyanate ("TDI"); 3,3'-dimethyl-4,4'-biphenylene diisocyanate ("TODI"); isophoronediisocyanate ("IPDI"); hexamethylene diisocyanate ("HDI"); naphthalene diisocyanate ("NDI"); xylene diisocyanate ("XDI"); p-tetramethylxylene diisocyanate ("p-TMXDI"); m-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"); tetracene diisocyanate; napthalene diisocyanate; anthracene diisocyanate; isocyanurate of toluene diisocyanate; uretdione of hexamethylene diisocyanate; and mixtures thereof. Polyisocyanates are known to those of ordinary skill in the art as having more than one isocyanate group, e.g., di-isocyanate, tri-isocyanate, and tetra-isocyanate. Preferably, the polyisocyanate includes MDI, PPDI, TDI, or a mixture thereof, and more preferably, the polyisocyanate includes MDI. It should be understood that, as used herein, the term "MDI" includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups, typically less than about 0.1% free monomer groups. Examples of "low free monomer" diisocyanates include, but are not limited to Low Free Monomer MDI, Low Free Monomer TDI, and Low Free Monomer PPDI.

The at least one polyisocyanate should have less than about 14% unreacted NCO groups. Preferably, the at least one polyisocyanate has no greater than about 7.5% NCO, and more preferably, less than about 7.0%.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material of the invention. Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups.

In another embodiment, polycaprolactone polyols are included in the materials of the invention. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups.

In yet another embodiment, the polycarbonate polyols are included in the polyurethane material of the invention. Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups. In one embodiment, the molecular weight of the polyol is from about 200 to about 4000.

Polyamine curatives are also suitable for use in the polyurethane composition of the invention and have been found to improve cut, shear, and impact resistance of the resultant balls. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline) ("MCDEA"); polytetramethyleneoxide-di-p-aminobenzoate; N,N'-dialkyl-diamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline) ("MDEA"); 4,4'-methylene-bis-(2,3-dichloroaniline) ("MDCA"); 4,4'-diamino-3,3'-diethyl-5,5'-dimethyl diphenylmethane; 2,2',3,3'-tetrachloro diamino diphenylmethane; trimethylene glycol di-p-aminobenzoate; and mixtures thereof. Preferably, the curing agent of the present invention includes 3,5-dimethylthio-2,4-toluenediamine and isomers thereof, such as ETHACURE 300, commercially available from Albermarle Corporation of Baton Rouge, La. Suitable polyamine curatives, which include both primary and secondary amines, preferably have molecular weights ranging from about 64 to about 2000.

At least one of a diol, triol, tetraol, or hydroxy-terminated curatives may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy) benzene; 1,3-bis-[2-(2-hydroxyethoxy) ethoxy] benzene; 1,3-bis-{2-[2-(2-hydroxyethoxy) ethoxy]ethoxy} benzene; 1,4-butanediol; 1,5-pentanediol; 1,6-hexanediol; resorcinol-di-(β-hydroxyethyl)ether; hydroquinone-di-(β-hydroxyethyl)ether; and mixtures thereof. Preferred hydroxy-terminated curatives include 1,3-bis(2-hydroxyethoxy) benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol, and mixtures thereof. Preferably, the hydroxy-terminated curatives have molecular weights ranging from about 48 to 2000. It should be understood that molecular weight, as used herein, is the absolute weight average molecular weight and would be understood as such by one of ordinary skill in the art.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

In a preferred embodiment of the present invention, saturated polyurethanes used to form cover layers, preferably the outer cover layer, and may be selected from among both castable thermoset and thermoplastic polyurethanes.

In this embodiment, the saturated polyurethanes of the present invention are substantially free of aromatic groups or moieties. Saturated polyurethanes suitable for use in the invention are a product of a reaction between at least one polyurethane prepolymer and at least one saturated curing agent. The polyurethane prepolymer is a product formed by a reaction between at least one saturated polyol and at least one saturated diisocyanate. As is well known in the art, a catalyst may be employed to promote the reaction between the curing agent and the isocyanate and polyol.

Saturated diisocyanates which can be used include, without limitation, ethylene diisocyanate; propylene-1,2-diisocyanate; tetramethylene-1,4-diisocyanate; 1,6-hexamethylene-diisocyanate ("HDI"); 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; isophorone diisocyanate ("IPDI"); methyl cyclohexylene diisocyanate; triisocyanate of HDI; triisocyanate of 2,2,4-trimethyl-1,6-hexane diisocyanate ("TMDI"). The most preferred saturated diisocyanates are 4,4'-dicyclohexylmethane diisocyanate ("HMDI") and isophorone diisocyanate ("IPDI").

Saturated polyols which are appropriate for use in this invention include without limitation polyether polyols such as polytetramethylene ether glycol and poly(oxypropylene) glycol. Suitable saturated polyester polyols include polyethylene adipate glycol, polyethylene propylene adipate glycol, polybutylene adipate glycol, polycarbonate polyol and ethylene oxide-capped polyoxypropylene diols. Saturated polycaprolactone polyols which are useful in the invention include diethylene glycol-initiated polycaprolactone, 1,4-butanediol-initiated polycaprolactone, 1,6-hexanediol-initiated polycaprolactone; trimethylol propane-initiated polycaprolactone, neopentyl glycol initiated polycaprolactone, and polytetramethylene ether glycol-initiated polycaprolactone. The most preferred saturated polyols are polytetramethylene ether glycol and PTMEG-initiated polycaprolactone.

Suitable saturated curatives include 1,4-butanediol, ethylene glycol, diethylene glycol, polytetramethylene ether glycol, propylene glycol; trimethanolpropane; tetra-(2-hydroxypropyl)-ethylenediamine; isomers and mixtures of isomers of cyclohexyldimethylol, isomers and mixtures of isomers of cyclohexane bis(methylamine); triisopropanolamine; ethylene diamine; diethylene triamine; triethylene tetramine; tetraethylene pentamine; 4,4'-dicyclohexylmethane diamine; 2,2,4-trimethyl-1,6-hexanediamine; 2,4,4-trimethyl-1,6-hexanediamine; diethyleneglycol di-(aminopropyl)ether; 4,4'-bis-(sec-butylamino)-dicyclohexylmethane; 1,2-bis-(sec-butylamino)cyclohexane; 1,4-bis-(sec-butylamino)cyclohexane; isophorone diamine; hexamethylene diamine; propylene diamine; 1-methyl-2,4-cyclohexyl diamine; 1-methyl-2,6-cyclohexyl diamine; 1,3-diaminopropane; dimethylamino propylamine; diethylamino propylamine; imido-bispropylamine; isomers and mixtures of isomers of diaminocyclohexane; monoethanolamine; diethanolamine; triethanolamine; monoisopropanolamine; and diisopropanolamine. The most preferred saturated curatives are 1,4-butanediol, 1,4-cyclohexyldimethylol and 4,4'-bis-(sec-butylamino)-dicyclohexylmethane.

The compositions of the invention may also be polyurea-based, which are distinctly different from polyurethane compositions, but also result in desirable aerodynamic and aesthetic characteristics when used in golf ball components. The polyurea-based compositions are preferably saturated in nature.

Without being bound to any particular theory, it is now believed that substitution of the long chain polyol segment in the polyurethane prepolymer with a long chain polyamine oligomer soft segment to form a polyurea prepolymer, improves shear, cut, and resiliency, as well as adhesion to other components. Thus, the polyurea compositions of this invention may be formed from the reaction product of an isocyanate and polyamine prepolymer crosslinked with a curing agent. For example, polyurea-based compositions of the invention may be prepared from at least one isocyanate, at least one polyether amine, and at least one diol curing agent or at least one diamine curing agent.

Any polyamine available to one of ordinary skill in the art is suitable for use in the polyurea prepolymer. Polyether amines are particularly suitable for use in the prepolymer. As used herein, "polyether amines" refer to at least polyoxyalkyleneamines containing primary amino groups attached to the terminus of a polyether backbone. Due to the rapid reaction of isocyanate and amine, and the insolubility of many urea products, however, the selection of diamines and polyether amines is limited to those allowing the successful formation of the polyurea prepolymers. In one embodiment, the polyether backbone is based on tetramethylene, propylene, ethylene, trimethylolpropane, glycerin, and mixtures thereof.

Suitable polyether amines include, but are not limited to, methyldiethanolamine; polyoxyalkylenediamines such as, polytetramethylene ether diamines, polyoxypropylenetriamine, and polyoxypropylene diamines; poly(ethylene oxide capped oxypropylene) ether diamines; propylene oxide-based triamines; triethyleneglycoldiamines; trimethylolpropane-based triamines; glycerin-based triamines; and mixtures thereof. In one embodiment, the polyether amine used to form the prepolymer is JEFFAMINE® 2000 (manufactured by Huntsman Chemical Co. of Austin, Tex.).

The molecular weight of the polyether amine for use in the polyurea prepolymer may range from about 100 to about 5000. As used herein, the term "about" is used in connection with one or more numbers or numerical ranges, should be understood to refer to all such numbers, including all numbers in a range. In one embodiment, the polyether amine molecular weight is about 200 or greater, preferably about 230 or greater. In another embodiment, the molecular weight of the polyether amine is about 4000 or less. In yet another embodiment, the molecular weight of the polyether amine is about 600 or greater. In still another embodiment, the molecular weight of the polyether amine is about 3000 or less. In yet another embodiment, the molecular weight of the polyether amine is between about 1000 and about 3000, and more preferably is between about 1500 to about 2500. Because lower molecular weight polyether amines may be prone to forming solid polyureas, a higher molecular weight oligomer, such as Jeffamine D2000, is preferred.

In one embodiment, the polyether amine has the generic structure:

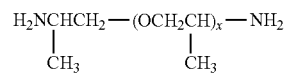

wherein the repeating unit x has a value ranging from about 1 to about 70. Even more preferably, the repeating unit may be from about 5 to about 50, and even more preferably is from about 12 to about 35.

In another embodiment, the polyether amine has the generic structure:

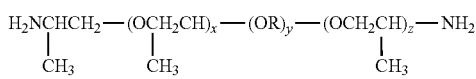

wherein the repeating units x and z have combined values from about 3.6 to about 8 and the repeating unit y has a value ranging from about 9 to about 50, and wherein R is —(CH$_2$)$_a$—, where "a" may be a repeating unit ranging from about 1 to about 10.

In yet another embodiment, the polyether amine has the generic structure:

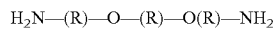

wherein R is —(CH$_2$)$_a$—, and "a" may be a repeating unit ranging from about 1 to about 10.

As briefly discussed above, some amines may be unsuitable for reaction with the isocyanate because of the rapid reaction between the two components. In particular, shorter chain amines are fast reacting. In one embodiment, however, a hindered secondary diamine may be suitable for use in the prepolymer. Without being bound to any particular theory, it is believed that an amine with a high level of stearic hindrance, e.g., a tertiary butyl group on the nitrogen atom, has a slower reaction rate than an amine with no hindrance or a low level of hindrance. For example, 4,4'-bis-(sec-butylamino)-dicyclohexylmethane (CLEARLINK® 1000) may be suitable for use in combination with an isocyanate to form the polyurea prepolymer.

Any isocyanate available to one of ordinary skill in the art is suitable for use in the polyurea prepolymer. Isocyanates for use with the present invention include aliphatic, cycloaliphatic, araliphatic, aromatic, any derivatives thereof, and combinations of these compounds having two or more isocyanate (NCO) groups per molecule. The isocyanates may be organic polyisocyanate-terminated prepolymers. The isocyanate-containing reactable component may also include any isocyanate-functional monomer, dimer, trimer, or multimeric adduct thereof, prepolymer, quasi-prepolymer, or mixtures thereof. Isocyanate-functional compounds may include monoisocyanates or polyisocyanates that include any isocyanate functionality of two or more.

Suitable isocyanate-containing components include diisocyanates having the generic structure: O═C═N—R—N═C═O, where R is preferably a cyclic, aromatic, or linear or branched hydrocarbon moiety containing from about 1 to about 20 carbon atoms. The diisocyanate may also contain one or more cyclic groups or one or more phenyl groups. When multiple cyclic or aromatic groups are present, linear and/or branched hydrocarbons containing from about 1 to about 10 carbon atoms can be present as spacers between the cyclic or aromatic groups. In some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

Examples of diisocyanates that can be used with the present invention include, but are not limited to, substituted and isomeric mixtures including 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4'-triisocyanate; naphthylene-1,5-diisocyanate; 2,4'-, 4,4'-, and 2,2-biphenyl diisocyanate; polyphenyl polymethylene polyisocyanate (PMDI); mixtures of MDI and PMDI; mixtures of PMDI and TDI; ethylene diisocyanate; propylene-1,2-diisocyanate; tetramethylene-1,2-diisocyanate; tetramethylene-1,3-diisocyanate; tetramethylene-1,4-diisocyanate; 1,6-hexamethylene-diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methyl-cyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl) dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate (H$_{12}$MDI); 2,4-hexahydrotoluene diisocyanate; 2,6-hexahydrotoluene diisocyanate; 1,2-, 1,3-, and 1,4-phenylene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uredione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof.

Examples of saturated diisocyanates that can be used with the present invention include, but are not limited to, ethylene diisocyanate; propylene-1,2-diisocyanate; tetramethylene diisocyanate; tetramethylene-1,4-diisocyanate; 1,6-hexamethylene-diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; cyclobutane-1,3-diisocyanate; cyclohexane-1,2-diisocyanate; cyclohexane-1,3-diisocyanate; cyclohexane-1,4-diisocyanate; methyl-cyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis (isocyanatomethyl)-cyclohexane diisocyanate; 4,4'-bis (isocyanatomethyl) dicyclohexane; 2,4'-bis (isocyanatomethyl) dicyclohexane; isophorone diisocyanate (IPDI); triisocyanate of HDI; triisocyanate of 2,2,4-trimethyl-1,6-hexane diisocyanate (TMDI); 4,4'-dicyclohexylmethane diisocyanate (H$_{12}$MDI); 2,4-hexahydrotoluene diisocyanate; 2,6-hexahydrotoluene diisocyanate; and mixtures thereof. Aromatic aliphatic isocyanates may also be used to form light stable materials. Examples of such isocyanates include 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, isocyanurate of isophorone diisocyanate, and mixtures thereof; dimerized uredione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof. In addition, the aromatic aliphatic isocyanates may be mixed with any of the saturated isocyanates listed above for the purposes of this invention.

The number of unreacted NCO groups in the polyurea prepolymer of isocyanate and polyether amine may be varied to control such factors as the speed of the reaction, the resultant hardness of the composition, and the like. For instance, the number of unreacted NCO groups in the polyurea prepolymer of isocyanate and polyether amine may be less than about 14 percent. In one embodiment, the polyurea prepolymer has from about 5 percent to about 11 percent unreacted NCO groups, and even more preferably has from about 6 to about 9.5 percent unreacted NCO groups. In one embodiment, the percentage of unreacted NCO groups is about 3 percent to about 9 percent. Alternatively, the percentage of unreacted NCO groups in the polyurea prepolymer may be about 7.5 percent or less, and more preferably, about 7 percent or less. In another embodiment, the unreacted NCO content is from about 2.5 percent to about 7.5 percent, and more preferably from about 4 percent to about 6.5 percent.

When formed, polyurea prepolymers may contain about 10 percent to about 20 percent by weight of the prepolymer of free isocyanate monomer. Thus, in one embodiment, the polyurea prepolymer may be stripped of the free isocyanate monomer. For example, after stripping, the prepolymer may contain about 1 percent or less free isocyanate monomer. In another embodiment, the prepolymer contains about 0.5 percent by weight or less of free isocyanate monomer.

The polyether amine may be blended with additional polyols to formulate copolymers that are reacted with excess isocyanate to form the polyurea prepolymer. In one embodiment, less than about 30 percent polyol by weight of the copolymer is blended with the saturated polyether amine. In another embodiment, less than about 20 percent polyol by weight of the copolymer, preferably less than about 15 percent by weight of the copolymer, is blended with the polyether amine. The polyols listed above with respect to the polyurethane prepolymer, e.g., polyether polyols, polycaprolactone polyols, polyester polyols, polycarbonate polyols, hydrocarbon polyols, other polyols, and mixtures thereof, are also suitable for blending with the polyether amine. The molecular weight of these polymers may be from about 200 to about 4000, but also may be from about 1000 to about 3000, and more preferably are from about 1500 to about 2500.

The polyurea composition can be formed by crosslinking the polyurea prepolymer with a single curing agent or a blend of curing agents. The curing agent of the invention is preferably an amine-terminated curing agent, more preferably a secondary diamine curing agent so that the composition contains only urea linkages. In one embodiment, the amine-terminated curing agent may have a molecular weight of about 64 or greater. In another embodiment, the molecular weight of the amine-curing agent is about 2000 or less. As discussed above, certain amine-terminated curing agents may be modified with a compatible amine-terminated freezing point depressing agent or mixture of compatible freezing point depressing agents.

Suitable amine-terminated curing agents include, but are not limited to, ethylene diamine; hexamethylene diamine; 1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 1,4-cyclohexane-bis-(methylamine); 1,3-cyclohexane-bis-(methylamine); diethylene glycol di-(aminopropyl)ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; dipropylene triamine; imido-bis-propylamine; monoethanolamine, diethanolamine; triethanolamine; monoisopropanolamine, diisopropanolamine; isophoronediamine; 4,4'-methylenebis-(2-chloroaniline); 3,5; dimethylthio-2,4-toluenediamine; 3,5-dimethylthio-2,6-toluenediamine; 3,5-diethylthio-2,4-toluenediamine; 3,5; diethylthio-2,6-toluenediamine; 4,4'-bis-(sec-butylamino)-diphenylmethane and derivatives thereof; 1,4-bis-(sec-butylamino)-benzene; 1,2-bis-(sec-butylamino)-benzene; N,N'-dialkylamino-diphenylmethane; N,N,N',N'-tetrakis (2-hydroxypropyl)ethylene diamine; trimethyleneglycol-di-p-aminobenzoate; polytetramethyleneoxide-di-p-aminobenzoate; 4,4'-methylenebis-(3-chloro-2,6-diethyleneaniline); 4,4'-methylenebis-(2,6-diethylaniline); meta-phenylenediamine; paraphenylenediamine; and mixtures thereof. In one embodiment, the amine-terminated curing agent is 4,4'-bis-(sec-butylamino)-dicyclohexylmethane.

Suitable saturated amine-terminated curing agents include, but are not limited to, ethylene diamine; hexamethylene diamine; 1-methyl-2,6-cyclohexyl diamine; tetrahydroxypropylene ethylene diamine; 2,2,4- and 2,4,4-trimethyl-1,6-hexanediamine; 4,4'-bis-(sec-butylamino)-dicyclohexylmethane; 1,4-bis-(sec-butylamino)-cyclohexane; 1,2-bis-(sec-butylamino)-cyclohexane; derivatives of 4,4'-bis-(sec-butylamino)-dicyclohexylmethane; 4,4'-dicyclohexylmethane diamine; 4,4'-methylenebis-(2,6-diethylaminocyclohexane; 1,4-cyclohexane-bis-(methylamine); 1,3-cyclohexane-bis-(methylamine); diethylene glycol di-(aminopropyl)ether; 2-methylpentamethylene-diamine; diaminocyclohexane; diethylene triamine; triethylene tetramine; tetraethylene pentamine; propylene diamine; 1,3-diaminopropane; dimethylamino propylamine; diethylamino propylamine; imido-bis-propylamine; monoethanolamine, diethanolamine; triethanolamine; monoisopropanolamine, diisopropanolamine; isophoronediamine; triisopropanolamine; and mixtures thereof. In addition, any of the polyether amines listed above may be used as curing agents to react with the polyurea prepolymers.

Suitable catalysts include, but are not limited to bismuth catalyst, oleic acid, triethylenediamine (DABCO®-33LV), di-butyltin dilaurate (DABCO®-T12) and acetic acid. The most preferred catalyst is di-butyltin dilaurate (DABCO®-T12). DABCO® materials are manufactured by Air Products and Chemicals, Inc.

Thermoplastic materials may be blended with other thermoplastic materials, but thermosetting materials are difficult if not impossible to blend homogeneously after the thermosetting materials are formed. Preferably, the saturated polyurethane comprises from about 1% to about 100%, more preferably from about 10% to about 75% of the cover composition and/or the intermediate layer composition. About 90% to about 10%, more preferably from about 90% to about 25% of the cover and/or the intermediate layer composition is comprised of one or more other polymers and/or other materials as described below. Such polymers include, but are not limited to polyurethane/polyurea ionomers, polyurethanes or polyureas, epoxy resins, polyethylenes, polyamides and polyesters, polycarbonates and polyacrylin. Unless otherwise stated herein, all percentages are given in percent by weight of the total composition of the golf ball layer in question.

Polyurethane prepolymers are produced by combining at least one polyol, such as a polyether, polycaprolactone, polycarbonate or a polyester, and at least one isocyanate. Thermosetting polyurethanes are obtained by curing at least one polyurethane prepolymer with a curing agent selected from a polyamine, triol or tetraol. Thermoplastic polyurethanes are obtained by curing at least one polyurethane prepolymer with a diol curing agent. The choice of the curatives is critical because some urethane elastomers that are cured with a diol and/or blends of diols do not produce urethane elastomers with the impact resistance required in a golf ball cover. Blending the polyamine curatives with diol cured urethane elastomeric formulations leads to the production of thermoset urethanes with improved impact and cut resistance.

Thermoplastic polyurethanes may be blended with suitable materials to produce a thermoplastic end product. Examples of such additional materials may include ionomers such as the SURLYN®, ESCOR® and IOTEK® copolymers described above.

Other suitable materials which may be combined with the saturated polyurethanes in forming the cover and/or intermediate layer(s) of the golf balls of the invention include ionic or non-ionic polyurethanes and polyureas, epoxy resins, polyethylenes, polyamides and polyesters. For example, the cover and/or intermediate layer may be formed from a blend of at least one saturated polyurethane and thermoplastic or thermoset ionic and non-ionic urethanes and polyurethanes, cationic urethane ionomers and urethane epoxies, ionic and non-ionic polyureas and blends thereof. Examples of suitable urethane ionomers are disclosed in U.S. Pat. No. 5,692,974 entitled "Golf Ball Covers", the disclosure of which is hereby incorporated by reference in its entirety. Other examples of suitable polyurethanes are described in U.S. Pat. No. 5,334,673. Examples of appropriate polyureas are discussed in U.S. Pat. No. 5,484,870 and examples of suitable polyurethanes cured with epoxy group containing curing agents are disclosed in U.S. Pat. No. 5,908,358, the disclosures of which are hereby incorporated herein by reference in their entirety.

A variety of conventional components can be added to the cover compositions of the present invention. These include, but are not limited to, white pigment such as $TiO_2$, ZnO, optical brighteners, surfactants, processing aids, foaming agents, density-controlling fillers, UV stabilizers and light stabilizers. Saturated polyurethanes are resistant to discoloration. However, they are not immune to deterioration in their mechanical properties upon weathering. Addition of UV absorbers and light stabilizers therefore helps to maintain the tensile strength and elongation of the saturated polyurethane elastomers. Suitable UV absorbers and light stabilizers include TINUVIN® 328, TINUVIN® 213, TINUVIN® 765, TINUVIN® 770 and TINUVIN® 622. The preferred UV absorber is TINUVIN® 328, and the preferred light stabilizer is TINUVIN® 765. TINUVIN® products are available from Ciba-Geigy. Dyes, as well as optical brighteners and fluorescent pigments may also be included in the golf ball covers produced with polymers formed according to the present invention. Such additional ingredients may be added in any amounts that will achieve their desired purpose.

Any method known to one of ordinary skill in the art may be used to polyurethanes of the present invention. One commonly employed method, known in the art as a one-shot method, involves concurrent mixing of the polyisocyanate, polyol, and curing agent. This method results in a mixture that is inhomogenous (more random) and affords the manufacturer less control over the molecular structure of the resultant composition. A preferred method of mixing is known as a prepolymer method. In this method, the polyisocyanate and the polyol are mixed separately prior to addition of the curing agent. This method affords a more homogeneous mixture resulting in a more consistent polymer composition. Other methods suitable for forming the layers of the present invention include reaction injection molding ("RIM"), liquid injection molding ("LIM"), and pre-reacting the components to form an injection moldable thermoplastic polyurethane and then injection molding, all of which are known to one of ordinary skill in the art.

Additional components which can be added to the polyurethane composition include UV stabilizers and other dyes, as well as optical brighteners and fluorescent pigments and dyes. Such additional ingredients may be added in any amounts that will achieve their desired purpose. It has been found by the present invention that the use of a castable, reactive material, which is applied in a fluid form, makes it possible to obtain very thin outer cover layers on golf balls. Specifically, it has been found that castable, reactive liquids, which react to form a urethane elastomer material, provide desirable very thin outer cover layers.

The castable, reactive liquid employed to form the urethane elastomer material can be applied over the core using a variety of application techniques such as spraying, dipping, spin coating, or flow coating methods which are well known in the art. An example of a suitable coating technique is that which is disclosed in U.S. Pat. No. 5,733,428, the disclosure of which is hereby incorporated by reference in its entirety.

The outer cover is preferably formed around the inner cover by mixing and introducing the material in the mold halves. It is important that the viscosity be measured over time, so that the subsequent steps of filling each mold half, introducing the core into one half and closing the mold can be properly timed for accomplishing centering of the core cover halves fusion and achieving overall uniformity. Suitable viscosity range of the curing urethane mix for introducing cores into the mold halves is determined to be approximately between about 2,000 cP and about 30,000 cP, with the preferred range of about 8,000 cP to about 15,000 cP.

To start the cover formation, mixing of the prepolymer and curative is accomplished in motorized mixer including mixing head by feeding through lines metered amounts of curative and prepolymer. Top preheated mold halves are filled and placed in fixture units using centering pins moving into holes in each mold. At a later time, a bottom mold half or a series of bottom mold halves have similar mixture amounts introduced into the cavity. After the reacting materials have resided in top mold halves for about 40 to about 80 seconds, a core is lowered at a controlled speed into the gelling reacting mixture.

A ball cup holds the ball core through reduced pressure (or partial vacuum). Upon location of the coated core in the halves of the mold after gelling for about 40 to about 80 seconds, the vacuum is released allowing core to be released. The mold halves, with core and solidified cover half thereon, are removed from the centering fixture unit, inverted and mated with other mold halves which, at an appropriate time earlier, have had a selected quantity of reacting polyurethane prepolymer and curing agent introduced therein to commence gelling.

Similarly, U.S. Pat. No. 5,006,297 to Brown et al. and U.S. Pat. No. 5,334,673 to Wu both also disclose suitable molding techniques which may be utilized to apply the castable reactive liquids employed in the present invention. Further, U.S. Pat. Nos. 6,180,040 and 6,180,722 disclose methods of preparing dual core golf balls. The disclosures of these patents are hereby incorporated by reference in their entirety. However, the method of the invention is not limited to the use of these techniques.

Depending on the desired properties, balls prepared according to the invention can exhibit substantially the same or higher resilience, or coefficient of restitution ("COR"), with a decrease in compression or modulus, compared to balls of conventional construction. Additionally, balls prepared according to the invention can also exhibit substantially higher resilience, or COR, without an increase in compression, compared to balls of conventional construction. Another measure of this resilience is the "loss tangent," or tan δ, which is obtained when measuring the dynamic stiffness of an object. Loss tangent and terminology relating to such dynamic properties is typically described according to ASTM D4092-90. Thus, a lower loss tangent indicates a higher resiliency, thereby indicating a higher rebound capacity. Low loss tangent indicates that most of the energy imparted to a golf ball from the club is converted to dynamic energy, i.e., launch velocity and resulting longer distance. The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the crosslinked reaction product material should be less than about 50,000 N/m at −50° C. Preferably, the dynamic stiffness should be between about 10,000 and 40,000 N/m at −50° C., more preferably, the dynamic stiffness should be between about 20,000 and 30,000 N/m at −50° C.

The molding process and composition of golf ball portions typically results in a gradient of material properties. Methods employed in the prior art generally exploit hardness to quantify these gradients. Hardness is a qualitative measure of static modulus and does not represent the modulus of the material at the deformation rates associated with golf ball use, i.e., impact by a club. As is well known to one skilled in the art of polymer science, the time-temperature superposition principle may be used to emulate alternative deformation rates. For golf ball portions including polybutadiene, a 1-Hz oscillation at temperatures between 0° C. and −50° C. are believed to be qualitatively equivalent to golf ball impact rates. Therefore, measurement of loss tangent and dynamic stiffness at 0° C. to −50° C. may be used to accurately anticipate golf ball performance, preferably at temperatures between about −20° C. and −50° C.

In another embodiment of the present invention, a golf ball of the present invention is substantially spherical and has a cover with a plurality of dimples formed on the outer surface thereof.

U.S. application Ser. No. 10/230,015, now U.S. Publication No. 2003/0114565, and U.S. application Ser. No. 10/108, 793, now U.S. Publication No. 2003/0050373, which are incorporated by reference herein in their entirety, discuss soft, high resilient ionomers, which are preferably from neutralizing the acid copolymer(s) of at least one E/X/Y copolymer, where E is ethylene, X is the α,β-ethylenically unsaturated carboxylic acid, and Y is a softening co-monomer. X is preferably present in 2-30 (preferably 4-20, most preferably 5-15) wt. % of the polymer, and Y is preferably present in 17-40 (preferably 20-40, and more preferably 24-35) wt. % of the polymer. Preferably, the melt index (MI) of the base resin is at least 20, or at least 40, more preferably, at least 75 and most preferably at least 150. Particular soft, resilient ionomers included in this invention are partially neutralized ethylene/ (meth) acrylic acid/butyl (meth)acrylate copolymers having an MI and level of neutralization that results in a melt processible polymer that has useful physical properties. The copolymers are at least partially neutralized. Preferably at least 40, or, more preferably at least 55, even more preferably about 70, and most preferably about 80 of the acid moiety of the acid copolymer is neutralized by one or more alkali metal, transition metal, or alkaline earth metal cations. Cations useful in making the ionomers of this invention comprise lithium, sodium, potassium, magnesium, calcium, barium, or zinc, or a combination of such cations.

The invention also relates to a "modified" soft, resilient thermoplastic ionomer that comprises a melt blend of (a) the acid copolymers or the melt processible ionomers made therefrom as described above and (b) one or more organic acid(s) or salt(s) thereof, wherein greater than 80%, preferably greater than 90% of all the acid of (a) and of (b) is neutralized. Preferably, 100% of all the acid of (a) and (b) is neutralized by a cation source. Preferably, an amount of cation source in excess of the amount required to neutralize 100% of the acid in (a) and (b) is used to neutralize the acid in (a) and (b). Blends with fatty acids or fatty acid salts are preferred.

The organic acids or salts thereof are added in an amount sufficient to enhance the resilience of the copolymer. Preferably, the organic acids or salts thereof are added in an amount sufficient to substantially remove remaining ethylene crystallinity of the copolymer.

Preferably, the organic acids or salts are added in an amount of at least about 5% (weight basis) of the total amount of copolymer and organic acid(s). More preferably, the organic acids or salts thereof are added in an amount of at least about 15%, even more preferably at least about 20%. Preferably, the organic acid(s) are added in an amount up to about 50% (weight basis) based on the total amount of copolymer and organic acid. More preferably, the organic acids or salts thereof are added in an amount of up to about 40%, more preferably, up to about 35%. The non-volatile, non-migratory organic acids preferably are one or more aliphatic, mono-functional organic acids or salts thereof as described below, particularly one or more aliphatic, mono-functional, saturated or unsaturated organic acids having less than 36 carbon atoms or salts of the organic acids, preferably stearic acid or oleic acid. Fatty acids or fatty acid salts are most preferred.

Processes for fatty acid (salt) modifications are known in the art. Particularly, the modified highly-neutralized soft, resilient acid copolymer ionomers of this invention can be produced by:

(a) melt-blending (1) ethylene, α,β-ethylenically unsaturated $C_{3-8}$ carboxylic acid copolymer(s) or melt-processible ionomer(s) thereof that have their crystallinity disrupted by addition of a softening monomer or other means with (2) sufficient non-volatile, non-migratory organic acids to substantially enhance the resilience and to disrupt (preferably remove) the remaining ethylene crystallinity, and then concurrently or subsequently (b) adding a sufficient amount of a cation source to increase the level of neutralization of all the acid moieties (including those in the acid copolymer and in the organic acid if the non-volatile, non-migratory organic acid is an organic acid) to the desired level.

The weight ratio of X to Y in the composition is at least about 1:20. Preferably, the weight ratio of X to Y is at least about 1:15, more preferably, at least about 1:10. Furthermore, the weight ratio of X to Y is up to about 1:1.67, more preferably up to about 1:2. Most preferably, the weight ratio of X to Y in the composition is up to about 1:2.2.

The acid copolymers used in the present invention to make the ionomers are preferably 'direct' acid copolymers (containing high levels of softening monomers). As noted above, the copolymers are at least partially neutralized, preferably at least about 40% of X in the composition is neutralized. More preferably, at least about 55% of X is neutralized. Even more preferably, at least about 70, and most preferably, at least about 80% of X is neutralized. In the event that the copolymer is highly neutralized (e.g., to at least 45%, preferably 50%, 55%, 70%, or 80%, of acid moiety), the MI of the acid copolymer should be sufficiently high so that the resulting neutralized resin has a measurable MI in accord with ASTM D-1238, condition E, at 190° C., using a 2160 gram weight. Preferably this resulting MI will be at least 0.1, preferably at least 0.5, and more preferably 1.0 or greater. Preferably, for highly neutralized acid copolymer, the MI of the acid copolymer base resin is at least 20, or at least 40, at least 75, and more preferably at least 150.

The acid copolymers preferably comprise alpha olefin, particularly ethylene, $C_{3-8}$ $\alpha,\beta$-ethylenically unsaturated carboxylic acid, particularly acrylic and methacrylic acid, and softening monomers, selected from alkyl acrylate, and alkyl methacrylate, wherein the alkyl groups have from 1-8 carbon atoms, copolymers. By "softening," it is meant that the crystallinity is disrupted (the polymer is made less crystalline). While the alpha olefin can be a $C_2$-$C_4$ alpha olefin, ethylene is most preferred for use in the present invention. Accordingly, it is described and illustrated herein in terms of ethylene as the alpha olefin.

The acid copolymers, when the alpha olefin is ethylene, can be described as E/X/Y copolymers where E is ethylene, X is the $\alpha,\beta$-ethylenically unsaturated carboxylic acid, and Y is a softening comonomer; X is preferably present in 2-30 (preferably 4-20, most preferably 5-15) wt. % of the polymer, and Y is preferably present in 17-40 (preferably 20-40, most preferably 24-35) wt. % of the polymer.

The ethylene-acid copolymers with high levels of acid (X) are difficult to prepare in continuous polymerizers because of monomer-polymer phase separation. This difficulty can be avoided however by use of "co-solvent technology" as described in U.S. Pat. No. 5,028,674, or by employing somewhat higher pressures than those which copolymers with lower acid can be prepared.

Specific acid-copolymers include ethylene/(meth) acrylic acid/n-butyl (meth)acrylate, ethylene/(meth) acrylic acid/isobutyl (meth)acrylate, ethylene/(meth) acrylic acid/methyl (meth)acrylate, and ethylene/(meth) acrylic acid/ethyl (meth) acrylate terpolymers.

The organic acids employed are aliphatic, mono-functional (saturated, unsaturated, or multi-unsaturated) organic acids, particularly those having fewer than 36 carbon atoms. Also salts of these organic acids may be employed. Fatty acids or fatty acid salts are preferred. The salts may be any of a wide variety, particularly including the barium, lithium, sodium, zinc, bismuth, potassium, strontium, magnesium or calcium salts of the organic acids. Particular organic acids useful in the present invention include caproic acid, caprylic acid, capric acid, lauric acid, stearic acid, behenic acid, erucic acid, oleic acid, and linoleic acid.

The optional filler component is chosen to impart additional density to blends of the previously described components, the selection being dependent upon the different parts (e.g., cover, mantle, core, center, intermediate layers in a multilayered core or ball) and the type of golf ball desired (e.g., one-piece, two-piece, three-piece or multiple-piece ball), as will be more fully detailed below.

Generally, the filler will be inorganic having a density greater than about 4 g/cm$^3$, preferably greater than 5 g/cm$^3$, and will be present in amounts between 0 to about 60 wt. % based on the total weight of the composition. Examples of useful fillers include zinc oxide, barium sulfate, lead silicate and tungsten carbide, as well as the other well-known fillers used in golf balls. It is preferred that the filler materials be non-reactive or almost non-reactive and not stiffen or raise the compression nor reduce the coefficient of restitution significantly.

Additional optional additives useful in the practice of the subject invention include acid copolymer wax (e.g., Allied wax AC 143 believed to be an ethylene/16-18% acrylic acid copolymer with a number average molecular weight of 2,040), which assist in preventing reaction between the filler materials (e.g., ZnO) and the acid moiety in the ethylene copolymer. Other optional additives include $TiO_2$, which is used as a whitening agent; optical brighteners; surfactants; processing aids; etc.

Ionomers may be blended with conventional ionomeric copolymers (di-, ter-, etc.), using well-known techniques, to manipulate product properties as desired. The blends would still exhibit lower hardness and higher resilience when compared with blends based on conventional ionomers.

Also, ionomers can be blended with non-ionic thermoplastic resins to manipulate product properties. The non-ionic thermoplastic resins would, by way of non-limiting illustrative examples, include thermoplastic elastomers, such as polyurethane, poly-ether-ester, poly-amide-ether, polyether-urea, PEBAX® (a family of block copolymers based on poly-ether-block-amide, commercially supplied by Atochem), styrene-butadiene-styrene (SBS) block copolymers, styrene (ethylene-butylene)-styrene block copolymers, etc., poly amide (oligomeric and polymeric), polyesters, polyolefins including PE, PP, E/P copolymers, etc., ethylene copolymers with various comonomers, such as vinyl acetate, (meth)acrylates, (meth)acrylic acid, epoxy-functionalized monomer, CO, etc., functionalized polymers with maleic anhydride grafting, epoxidization etc., elastomers, such as EPDM, metallocene catalyzed PE and copolymer, ground up powders of the thermoset elastomers, etc. Such thermoplastic blends comprise about 1% to about 99% by weight of a first thermoplastic and about 99% to about 1% by weight of a second thermoplastic.

Additionally, the compositions of U.S. Pat. Nos. 6,953,820 and 6,653,382, both of which are incorporated herein in their entirety, discuss compositions having high COR when formed into solid spheres.

The thermoplastic composition of this invention comprises a polymer which, when formed into a sphere that is 1.50 to 1.54 inches in diameter, has a coefficient of restitution when measured by firing the sphere at an initial velocity of 125 ft/s against a steel plate positioned 3 ft from the point where initial velocity and rebound velocity are determined and by dividing the rebound velocity from the plate by the initial velocity and an Atti compression of no more than 100.

Initial velocity of a golf ball after impact with a golf club is governed by the United States Golf Association ("USGA"). The USGA requires that a regulation golf ball can have an initial velocity of no more than 250 ft/s±2% (effectively 255 ft/s). The USGA initial velocity limit is related to the ultimate distance that a golf ball may travel (280 yards±6%), and is also related to the COR. The COR is the ratio of the a) relative velocity between two objects after direct impact to the b) relative velocity before impact. As a result, the COR can vary from 0 to 1.0, with 1.0 being equivalent to a perfectly or completely elastic collision and 0 being equivalent to a perfectly plastic or completely inelastic collision.

One conventional technique for measuring COR uses a golf ball or sphere, an air cannon, and a stationary steel plate.

The steel plate provides an impact surface weighing about 100 lb (45 kg). A pair of ballistic light screens, which measure ball velocity, are spaced apart and located between the air cannon and the steel plate. The golf ball is fired from the air cannon toward the steel plate over a range of test velocities from 50 ft/s to 180 ft/s. As the ball travels toward the steel plate, it activates each light screen so that the time at each light screen is measured. This provides an incoming time period proportional to the ball incoming velocity. The ball impacts the steel plate and rebounds though the light screens, which again measure the time period required to transit between the light screens. This provides an outgoing transit time period proportional to the ball outgoing velocity. The COR can be calculated by the ratio of the outgoing transit time period to the incoming transit time period, $COR=T_{out}/T_{in}$.

Another COR measuring method uses a titanium disk. The titanium disk, intending to simulate a golf club, is circular and has a diameter of about 4 inches and has a mass of about 200 g. The impact face of the titanium disk may also be flexible and has its own COR, as discussed further below. The disk is mounted on an X-Y-Z table so that its position can be adjusted relative to the launching device prior to testing. A pair of ballistic light screens are spaced apart and located between the launching device and the titanium disk. The ball is fired from the launching device toward the titanium disk at a predetermined test velocity. As the ball travels toward the titanium disk, it activates each light screen so that the time period to transit between the light screens is measured. This provides an incoming transit time period proportional to the ball incoming velocity. The ball impacts the titanium disk, and rebounds through the light screens which measure the time period to transit between the light screens. This provides an outgoing transit time period proportional to the ball's outgoing velocity. Coefficient of restitution can be calculated from the ratio of the outgoing time period to the incoming time period along with the mass of the disk and ball: $COR=[(T_{out}/T_{in})(M_e+M_b)+M_b]/M_e$.

The thermoplastic composition of this invention preferably comprises (a) aliphatic, mono-functional organic acid(s) having fewer than 36 carbon atoms; and (b) ethylene, $C_3$ to $C_8$ α,β-ethylenically unsaturated carboxylic acid copolymer(s) and ionomer(s) thereof, wherein greater than 90%, preferably near 100%, and more preferably 100% of all the acid of (a) and (b) are neutralized.

The thermoplastic composition preferably comprises melt-processible, highly-neutralized (greater than 90%, preferably near 100%, and more preferably 100%) polymer of (1) ethylene, $C_3$ to $C_8$ α,β-ethylenically unsaturated carboxylic acid copolymers that have their crystallinity disrupted by addition of a softening monomer or other means such as high acid levels, and (2) non-volatile, non-migratory agents such as organic acids (or salts) selected for their ability to substantially or totally suppress any remaining ethylene crystallinity. Agents other than organic acids (or salts) may be used.

It has been found that, by modifying an acid copolymer or ionomer with a sufficient amount of specific organic acids (or salts thereof); it is possible to highly neutralize the acid copolymer without losing processibility or properties such as elongation and toughness. The organic acids employed in the present invention are aliphatic, mono-functional, saturated or unsaturated organic acids, particularly those having fewer than 36 carbon atoms, and particularly those that are non-volatile and non-migratory and exhibit ionic array plasticizing and ethylene crystallinity suppression properties.

With the addition of sufficient organic acid, greater than 90%, nearly 100%, and preferably 100% of the acid moieties in the acid copolymer from which the ionomer is made can be neutralized without losing the processibility and properties of elongation and toughness.

The melt-processible, highly-neutralized acid copolymer ionomer can be produced by the following:

(a) melt-blending (1) ethylene α,β-ethylenically unsaturated $C_{3-8}$ carboxylic acid copolymer(s) or melt-processible ionomer(s) thereof (ionomers that are not neutralized to the level that they have become intractable, that is not melt-processible) with (1) one or more aliphatic, mono-functional, saturated or unsaturated organic acids having fewer than 36 carbon atoms or salts of the organic acids, and then concurrently or subsequently (b) adding a sufficient amount of a cation source to increase the level of neutralization all the acid moieties (including those in the acid copolymer and in the organic acid) to greater than 90%, preferably near 100%, more preferably to 100%.

Preferably, highly-neutralized thermoplastics of the invention can be made by:

(a) melt-blending (1) ethylene, α,β-ethylenically unsaturated $C_{3-8}$ carboxylic acid copolymer(s) or melt-processible ionomer(s) thereof that have their crystallinity disrupted by addition of a softening monomer or other means with (2) sufficient non-volatile, non-migratory agents to substantially remove the remaining ethylene crystallinity, and then concurrently or subsequently (b) adding a sufficient amount of a cation source to increase the level of neutralization all the acid moieties (including those in the acid copolymer and in the organic acid if the non-volatile, non-migratory agent is an organic acid) to greater than 90%, preferably near 100%, more preferably to 100%.

The acid copolymers used in the present invention to make the ionomers are preferably 'direct' acid copolymers. They are preferably alpha olefin, particularly ethylene, $C_{3-8}$ α,β-ethylenically unsaturated carboxylic acid, particularly acrylic and methacrylic acid, copolymers. They may optionally contain a third softening monomer. By "softening," it is meant that the crystallinity is disrupted (the polymer is made less crystalline). Suitable "softening" comonomers are monomers selected from alkyl acrylate, and alkyl methacrylate, wherein the alkyl groups have from 1-8 carbon atoms.

The acid copolymers, when the alpha olefin is ethylene, can be described as E/X/Y copolymers where E is ethylene, X is the α,β-ethylenically unsaturated carboxylic acid, and Y is a softening comonomer. X is preferably present in 3-30 (preferably 4-25, most preferably 5-20) wt. % of the polymer, and Y is preferably present in 0-30 (alternatively 3-25 or 10-23) wt. % of the polymer.

In one embodiment, golf balls made with the cores of the invention enjoy high COR at relatively low club speeds. The COR of these balls is higher than the COR of similar balls with higher compression cores at relatively low club speeds. At higher club speeds, however, the COR of golf balls with low compression cores can be lower than the COR of balls with higher compression cores. As illustrated herein, a first golf ball with a 1.505-inch diameter core and a core compression of 48 (hereinafter "Sample-48") and a second golf ball with a 1.515-inch diameter core and a core compression of 80 (hereinafter "Sample-80") were subject to the following distance and COR tests. Sample-48 and Sample-80 have essentially the same size core and similar dual-layer cover. The single most significant difference between these two balls is the compression of the respective cores.

As used in the ball speed test, the "average driver set-up" refers to a set of launch conditions, i.e., at a club head speed to which a mechanical golf club has been adjusted so as to generate a ball speed of about 140 ft/s. Similarly, the "standard driver set-up" refers to a similar ball speed at launch conditions of about 160 ft/s; the "Pro 167 set-up" refers to a ball speed at launch conditions of about 167 ft/s; and the "Big Pro 175 set-up" refers to a ball speed at launch conditions of about 175 ft/s. Also, as used in the COR test, the mass plate is a 45-kg plate (100 lb) against which the balls strike at the indicated speed. The 200-g solid plate is a smaller mass that the balls strike and resembles the mass of a club head. The 199.8-g calibration plate resembles a driver with a flexible face that has a COR of 0.830.

The ball speed test results show that while Sample-48 holds a ball speed advantage at club speeds of 140 ft/s to 160 ft/s launch conditions, Sample-80 decidedly has better ball speed at 167 ft/s and 175 ft/s launch conditions.

Similarly, the COR test results show that at the higher collision speed (160 ft/s), the COR generally goes down for both balls, but the 199.8-g calibration test shows that the COR of the higher compression Sample-80 is significantly better than the lower compression Sample-48 at the collision speed (160 ft/s). Additionally, while the COR generally goes down for both balls, the rate of decrease is much less for Sample-80 than for Sample-48. Unless specifically noted, COR values used hereafter are measured by either the mass plate method or the 200-gram solid plate method, i.e., where the impact plate is not flexible. Unless otherwise noted, COR values used hereafter are measured by either the mass plate method or the 200-g solid plate method.

Without being limited to any particular theory, the inventors of the present invention believe that at high impact, the ball with lower core compression deforms more than the ball with higher core compression. Such deformation negatively affects the initial velocity and COR of the ball.

In accordance to the present invention, a golf ball is provided with a low compression and high COR layer, which is supported or otherwise reinforced by a low deformation layer.

On the other hand, the low deformation layer in accordance to the present invention may comprise a durable, low deformation material such as metal, rigid plastics, or polymers re-enforced with high strength organic or inorganic fillers or fibers, or blends or composites thereof, as discussed below. Suitable plastics or polymers include, but not limited to, high cis- or trans-polybutadiene, one or more of partially or fully neutralized ionomers including those neutralized by a metal ion source wherein the metal ion is the salt of an organic acid, polyolefins including polyethylene, polypropylene, polybutylene and copolymers thereof including polyethylene acrylic acid or methacrylic acid copolymers, or a terpolymer of ethylene, a softening acrylate class ester such as methyl acrylate, n-butyl-acrylate or iso-butyl-acrylate, and a carboxylic acid such as acrylic acid or methacrylic acid (e.g., terpolymers including polyethylene-methacrylic acid-n or iso-butyl acrylate and polyethylene-acrylic acid-methyl acrylate, polyethylene ethyl or methyl acrylate, polyethylene vinyl acetate, polyethylene glycidyl alkyl acrylates). Suitable polymers also include metallocene catalyzed polyolefins, polyesters, polyamides, non-ionomeric thermoplastic elastomers, copolyether-esters, copolyether-amides, EPR, EPDM, thermoplastic or thermosetting polyurethanes, polyureas, polyurethane ionomers, epoxies, polycarbonates, polybutadiene, polyisoprene, and blends thereof. In the case of metallocenes, the polymer may be cross-linked with a free radical source, such as peroxide, or by high radiation.

Spheres were prepared using fully neutralized ionomers A and B.

TABLE I

| Sample | Resin Type (%) | Acid Type (%) | Cation (% neut*) | M.I. (g/10 min) |
|---|---|---|---|---|
| 1A | A(60) | Oleic (40) | Mg (100) | 1.0 |
| 2B | A(60) | Oleic (40) | Mg (105)* | 0.9 |
| 3C | B(60) | Oleic (40) | Mg (100) | 0.9 |
| 4D | B(60) | Oleic (40) | Mg (105)* | 0.9 |
| 5E | B(60) | Stearic (40) | Mg (100) | 0.85 |

A - 76.9% ethylene, 14.8% normal butyl acrylate, 8.3% acrylic acid
B - 75% ethylene, 14.9% normal butyl acrylate, 10.1% acrylic acid
*indicates that cation was sufficient to neutralize 105% of all the acid in the resin and the organic acid.

These compositions were molded into 1.53-inch spheres for which data is presented in the following table.

TABLE II

| Sample | Atti Compression | COR @ 125 ft/s |
|---|---|---|
| 1A | 75 | 0.826 |
| 2B | 75 | 0.826 |
| 3C | 78 | 0.837 |
| 4D | 76 | 0.837 |
| 5E | 97 | 0.807 |

Further testing of commercially available highly neutralized polymers HNP1 and HNP2 had the following properties.

TABLE III

Material Properties

|  | HNP1 | HNP2 |
|---|---|---|
| Specific Gravity (g/cm$^3$) | 0.966 | 0.974 |
| Melt Flow, 190° C., 10-kg load | 0.65 | 1.0 |
| Shore D Flex Bar (40 hr) | 47.0 | 46.0 |
| Shore D Flex Bar (2 week) | 51.0 | 48.0 |
| Flex Modulus, psi (40 hr) | 25,800 | 16,100 |
| Flex Modulus, psi (2 week) | 39,900 | 21,000 |
| DSC Melting Point (° C.) | 61.0 | 61/101 |
| Moisture (ppm) | 1500 | 4500 |
| Weight % Mg | 2.65 | 2.96 |

TABLE IV

Solid Sphere Data

Material

|  | HNP1 | HNP2 | HNP2a | HNP1a | HNP1a/HNP2a (50:50 blend) |
|---|---|---|---|---|---|
| Spec. Grav. (g/cm$^3$) | 0.954 | 0.959 | 1.153 | 1.146 | 1.148 |
| Filler | None | None | Tungsten | Tungsten | Tungsten |
| Compression | 107 | 83 | 86 | 62 | 72 |
| COR | 0.827 | 0.853 | 0.844 | 0.806 | 0.822 |
| Shore D | 51 | 47 | 49 | 42 | 45 |
| Shore C |  |  | 79 | 72 | 75 |

These materials are exemplary examples of the preferred center and/or core layer compositions of the present invention. They may also be used as a cover layer herein.

The golf ball components of the present invention, in particular the core (center and/or outer core layers) may be formed from a co-polymer of ethylene and an α,β-unsaturated carboxylic acid. In another embodiment, they may be formed from a terpolymer of ethylene, an α,β-unsaturated carboxylic acid, and an n-alkyl acrylate. Preferably, the α,β-unsaturated carboxylic acid is acrylic acid or methacrylic acid. In a preferred embodiment, the n-alkyl acrylate is n-butyl acrylate. Further, in a preferred form, the co- or ter-polymer comprises a level of fatty acid salt greater than 5 phr of the base resin. The preferred fatty acid salt is magnesium oleate or magnesium stearate.

It is highly preferred that the carboxylic acid in the intermediate layer is 100% neutralized with metal ions. The metal ions used to neutralize the carboxylic acid may be any metal ion known in the art. Preferably, the metal ions comprise magnesium ions. If the material used in the intermediate layer is not 100% neutralized, the resultant resilience properties such as COR and initial velocity may not be sufficient to produce the improved initial velocity and distance properties of the present invention.

The golf ball components can comprise various levels of the three components of the co- or terpolymer as follows: from about 60 to about 90% ethylene, from about 8 to about 20% by weight of the $\alpha,\beta$-unsaturated carboxylic acid, and from 0% to about 25% of the n-alkyl acrylate. The co- or terpolymer may also contain an amount of a fatty acid salt. The fatty acid salt preferably comprises magnesium oleate. These materials are commercially available from DuPont, under the tradename DuPont HPF®.

In one embodiment, the core and/or core layers (or other intermediate layers) comprises a copolymer of about 81% by weight ethylene and about 19% by weight acrylic acid, wherein 100% of the carboxylic acid groups are neutralized with magnesium ions. The copolymer also contains at least 5 phr of magnesium oleate. Material suitable for use as this layer is available from DuPont under the tradename DuPont HPF SEP 1313-4®.

In a second preferred embodiment, the core and/or core layers (or other intermediate layers) comprise a copolymer of about 85% by weight ethylene and about 15% by weight acrylic acid, wherein 100% of the acid groups are neutralized with magnesium ions. The copolymer also contains at least 5 phr of magnesium oleate. Material suitable for use as this layer is available from DuPont under the tradename DuPont HPF SEP 1313-3®.

In a third preferred embodiment, the core and/or core layers (or other intermediate layers) comprise a copolymer of about 88% by weight ethylene and about 12% by weight acrylic acid, wherein 100% of the acid groups are neutralized with magnesium ions. The copolymer also contains at least 5 phr of magnesium oleate. Material suitable for use as this layer is available from DuPont under the tradename DuPont HPF AD 1027®.

In a further preferred embodiment, the core and/or core layers (or other intermediate layers) are adjusted to a target specific gravity to enable the ball to be balanced. For a 1.68-inch diameter golf ball having a ball weight of about 1.61 oz, the target specific gravity is about 1.125. It will be appreciated by one of ordinary skill in the art that the target specific gravity will vary based upon the size and weight of the golf ball. The specific gravity is adjusted to the desired target through the use of inorganic fillers. Preferred fillers used for compounding the inner layer to the desired specific gravity include, but are not limited to, tungsten, zinc oxide, barium sulfate and titanium dioxide. Other suitable fillers, in particular nano or hybrid materials, include those described in U.S. Pat. No. 6,793,592 and U.S. application Ser. No. 10/037,987, which are incorporated herein, in their entirety, by reference thereto.

Some preferred golf ball layers formed from the above compositions were molded onto a golf ball center using DuPont HPF RX-85®, Dupont HPF SEP 1313-3®, or DuPont HPF SEP 1313-4®. 1) DuPont HPF RX-85®, a copolymer of about 88% ethylene and about 12% acrylic acid, wherein 100% of the acid groups are neutralized with magnesium ions. Further, the copolymer contains a fixed amount of magnesium oleate. This material was compounded to a specific gravity of about 1.125 using tungsten. The Shore D hardness of this material (as measured on the curved surface of the inner cover layer) was about 58 to about 60. 2) DuPont HPF SEP 1313-3®, a copolymer of about 85% ethylene and about 15% acrylic acid, wherein 100% of the acid groups are neutralized with magnesium ions. Further, the copolymer contains a fixed amount of magnesium oleate. This material was compounded to a specific gravity of about 1.125 using tungsten. The Shore D hardness of this material (as measured on the curved surface of the inner cover layer) was about 58-60. 3) DuPont HPF SEP 1313-4®, a copolymer of about 81% ethylene and about 19% acrylic acid, wherein 100% of the acid groups are neutralized with magnesium ions. Further, the copolymer contains a fixed amount of magnesium oleate. This material was compounded to a specific gravity of about 1.125 using tungsten. The Shore D hardness of this material (as measured on the curved surface of the inner cover layer) was about 58-60.

The centers/cores/layers can also comprise various levels of the three components of the terpolymer as follows: from about 60% to 80% ethylene; from about 8% to 20% by weight of the $\alpha,\beta$-unsaturated carboxylic acid; and from about 0% to 25% of the n-alkyl acrylate, preferably 5% to 25%. The terpolymer will also contain an amount of a fatty acid salt, preferably magnesium oleate. These materials are commercially available under the trade name DuPont® HPF™. In a preferred embodiment, a terpolymer suitable for the invention will comprise from about 75% to 80% by weight ethylene, from about 8% to 12% by weight of acrylic acid, and from about 8% to 17% by weight of n-butyl acrylate, wherein all of the carboxylic acid is neutralized with magnesium ions, and comprises at least 5 phr of magnesium oleate.

In another preferred embodiment, the cover layer will comprise a terpolymer of about 70% to 75% by weight ethylene, about 10.5% by weight acrylic acid, and about 15.5% to 16.5% by weight n-butyl acrylate. The acrylic acid groups are 100% neutralized with magnesium ions. The terpolymer will also contain an amount of magnesium oleate. Materials suitable for use as this layer are sold under the trade name DuPont® HPF™ AD 1027.

In yet another preferred embodiment, the centers/cores/layers comprise a copolymer comprising about 88% by weight of ethylene and about 12% by weight acrylic acid, with 100% of the acrylic acid neutralized by magnesium ions. The centers/cores/layers may also contain magnesium oleate. Material suitable for this embodiment was produced by DuPont as experimental product number SEP 1264-3. Preferably the centers/cores/layers are adjusted to a target specific gravity of 1.125 using inert fillers to adjust the density with minimal effect on the performance properties of the cover layer. Preferred fillers used for compounding the centers/cores/layers to the desired specific gravity include but are not limited to tungsten, zinc oxide, barium sulfate, and titanium dioxide.

A first set of intermediate layers were molded onto cores using DuPont® HPF™ AD1027, which is a terpolymer of about 73% to 74% ethylene, about 10.5% acrylic acid, and about 15.5% to 16.5% n-butyl acrylate, wherein 100% of the acid groups are neutralized with magnesium ions. Further, the terpolymer contains a fixed amount of greater than 5 phr magnesium oleate. This material is compounded to a specific gravity of about 1.125 using barium sulfate and titanium dioxide. The Shore D hardness of this material (as measured on the curved surface of the inner cover layer) is about 58-60.

A second set of layers were molded onto each of the experimental cores using DuPont experimental HPF™ SEP 1264-3, which is a copolymer of about 88% ethylene and about 12% acrylic acid, wherein 100% of the acid groups are neutralized with magnesium ions. Further, the copolymer contains a fixed amount of at least 5 phr magnesium oleate. This material is compounded to a specific gravity of about 1.125 using zinc oxide. The Shore D hardness of this material (as measured on the curved surface of the inner cover layer) is about 61-64.

A first set of covers were molded onto each of the core/layer components using DuPont HPF™ 1000, which is a terpolymer of about 75% to 76% ethylene, about 8.5% acrylic acid, and about 15.5% to 16.5% n-butyl acrylate, wherein 100% of the acid groups are neutralized with magnesium ions. Further, the terpolymer contains a fixed amount of at least 5 phr of magnesium stearate. This material is compounded to a target specific gravity of about 1.125 using barium sulfate and titanium dioxide. The Shore D hardness of this material (as measured on the curved surface of the molded golf ball) is about 60-62.

In one embodiment, the formation of a golf ball starts with forming the inner core. The inner core, outer core, and the cover are formed by compression molding, by injection molding, or by casting. These methods of forming cores and covers of this type are well known in the art. The materials used for the inner and outer core, as well as the cover, are selected so that the desired playing characteristics of the ball are achieved. The inner and outer core materials have substantially different material properties so that there is a predetermined relationship between the inner and outer core materials, to achieve the desired playing characteristics of the ball.

In one embodiment, the inner core is formed of a first material having a first Shore D hardness, a first elastic modulus, a first specific gravity, and a first Bashore resilience. The outer core is formed of a second material having a second Shore D hardness, a second elastic modulus, a second specific gravity, and a second Bashore resilience. Preferably, the material property of the first material equals at least one selected from the group consisting of the first Shore D hardness differing from the second Shore D hardness by at least 10 points, the first elastic modulus differing from the second elastic modulus by at least 10%, the first specific gravity differing from the second specific gravity by at least 0.1, or a first Bashore resilience differing from the second Bashore resilience by at least 10%. It is more preferred that the first material have all of these material property relationships.

Moreover, it is preferred that the first material has the first Shore D hardness between about 30 and about 80, the first elastic modulus between about 5,000 psi and about 100,000 psi, the first specific gravity between about 0.8 and about 1.6, and the first Bashore resilience greater than 30%.

In another embodiment, the first Shore D hardness is less than the second Shore D hardness, the first elastic modulus is less than the second elastic modulus, the first specific gravity is less than the second specific gravity, and the first Bashore resilience is less than the second Bashore resilience. In another embodiment, the first material properties are greater than the second material properties. The relationship between the first and second material properties depends on the desired playability characteristics.

Suitable inner and outer core materials include HNP's neutralized with organic fatty acids and salts thereof, metal cations, or a combination of both, thermosets, such as rubber, polybutadiene, polyisoprene; thermoplastics, such as ionomer resins, polyamides or polyesters; or thermoplastic elastomers. Suitable thermoplastic elastomers include PEBAX®, HYTREL®, thermoplastic urethane, and KRATON®, which are commercially available from Elf-Atochem, DuPont, BF Goodrich, and Shell, respectively. The inner and outer core materials can also be formed from a castable material. Suitable castable materials include, but are not limited to, urethane, urea, epoxy, diols, or curatives.

The cover is selected from conventional materials used as golf ball covers based on the desired performance characteristics. The cover may be comprised of one or more layers. Cover materials such as ionomer resins, blends of ionomer resins, thermoplastic or thermoset urethanes, and balata, can be used as known in the art and discussed above. In other embodiments, additional layers may be added to those mentioned above or the existing layers may be formed by multiple materials.

When the core is formed with a fluid-filled center, the center is formed first then the inner core is molded around the center. Conventional molding techniques can be used for this operation. Then the outer core and cover are formed thereon, as discussed above. The fluid within the inner core can be a wide variety of materials including air, water solutions, liquids, gels, foams, hot-melts, other fluid materials and combinations thereof. The fluid is varied to modify the performance parameters of the ball, such as the moment of inertia or the spin decay rate. Examples of suitable liquids include either solutions such as salt in water, corn syrup, salt in water and corn syrup, glycol and water or oils. The liquid can further include pastes, colloidal suspensions, such as clay, barytes, carbon black in water or other liquid, or salt in water/glycol mixtures. Examples of suitable gels include water gelatin gels, hydrogels, water/methyl cellulose gels and gels comprised of copolymer rubber based materials such a styrene-butadiene-styrene rubber and paraffinic and/or naphthenic oil. Examples of suitable melts include waxes and hot melts. Hot-melts are materials which at or about normal room temperatures are solid but at elevated temperatures become liquid. A high melting temperature is desirable since the liquid core is heated to high temperatures during the molding of the inner core, outer core, and the cover. The liquid can be a reactive liquid system, which combines to form a solid. Examples of suitable reactive liquids are silicate gels, agar gels, peroxide cured polyester resins, two part epoxy resin systems and peroxide cured liquid polybutadiene rubber compositions.

The "effective compression constant," which is designated EC, is the ratio of deflection of a 1.50 inch diameter sphere made of any single material used in the core under a 100 kg load that as represented by the formula EC=F/d, where, F is a 100 kg load; and d is the deflection in millimeters. If the sphere tested is only inner core material, the effective compression constant for the inner core material alone is designated $EC_{IC}$. If the sphere tested is only outer core material, the effective compression constant for the outer core material alone is designated $EC_{OC}$. The sum of the constants for the inner core $EC_{IC}$ and outer core $EC_{OC}$ is the constant $EC_S$. If the sphere tested is inner and outer core material, the core effective compression constant is designated $EC_C$. It is has been determined that very favorable cores are formed when their core effective compression constant $EC_C$ is less than the sum of the effective compression constants of the inner core and outer core $EC_S$. It is recommended that the core effective compression constant $EC_C$ is less than about 90% of the sum of the effective compression constants of the inner core and outer core $EC_S$. More preferably, the core effective compression constant $EC_C$ is less than or equal to about 50% of the sum of the effective compression constants of the inner core and outer core $EC_S$. The ratios of the inner core material to outer core material and the geometry of the inner core to the outer core are selected to achieve these core effective compression constants.

The resultant golf balls typically have a coefficient of restitution of greater than about 0.7, preferably greater than about 0.75, and more preferably greater than about 0.78. The golf balls also typically have an Atti compression of at least about 40, preferably from about 50 to 120, and more preferably from about 60 to 100. The golf ball cured polybutadiene material typically has a hardness of at least about 15 Shore A, preferably between about 30 Shore A and 80 Shore D, more preferably between about 50 Shore A and 60 Shore D.

In addition to the HNP's neutralized with organic fatty acids and salts thereof, core compositions may comprise at least one rubber material having a resilience index of at least about 40. Preferably the resilience index is at least about 50. Polymers that produce resilient golf balls and, therefore, are suitable for the present invention, include but are not limited to CB23, CB22, commercially available from of Bayer Corp. of Orange, Tex., BR60, commercially available from Enichem of Italy, and 1207G, commercially available from Goodyear Corp. of Akron, Ohio.

Additionally, the unvulcanized rubber, such as polybutadiene, in golf balls prepared according to the invention typically has a Mooney viscosity of between about 40 and about 80, more preferably, between about 45 and about 65, and most preferably, between about 45 and about 55. Mooney viscosity is typically measured according to ASTM-D1646.

When golf balls are prepared according to the invention, they typically will have dimple coverage greater than about 60 percent, preferably greater than about 65 percent, and more preferably greater than about 75 percent. The flexural modulus of the cover on the golf balls, as measured by ASTM method D6272-98, Procedure B, is typically greater than about 500 psi, and is preferably from about 500 psi to 150,000 psi. As discussed herein, the outer cover layer is preferably formed from a relatively soft polyurethane material. In particular, the material of the outer cover layer should have a material hardness, as measured by ASTM-D2240, less than about 45 Shore D, preferably less than about 40 Shore D, more preferably between about 25 and about 40 Shore D, and most preferably between about 30 and about 40 Shore D. The casing preferably has a material hardness of less than about 70 Shore D, more preferably between about 30 and about 70 Shore D, and most preferably, between about 50 and about 65 Shore D.

In a preferred embodiment, the intermediate layer material hardness is between about 40 and about 70 Shore D and the outer cover layer material hardness is less than about 40 Shore D. In a more preferred embodiment, a ratio of the intermediate layer material hardness to the outer cover layer material hardness is greater than 1.5.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

In one embodiment, the core of the present invention has an Atti compression of between about 50 and about 90, more preferably, between about 60 and about 85, and most preferably, between about 65 and about 85. The overall outer diameter ("OD") of the core is less than about 1.590 inches, preferably, no greater than 1.580 inches, more preferably between about 1.540 inches and about 1.580 inches, and most preferably between about 1.525 inches to about 1.570 inches. The OD of the casing of the golf balls of the present invention is preferably between 1.580 inches and about 1.640 inches, more preferably between about 1.590 inches to about 1.630 inches, and most preferably between about 1.600 inches to about 1.630 inches.

Additionally, the core may be a two- or three-piece core, wherein the outermost core layer is formed from an HNP composition. In a two-piece core embodiment, the center or innermost core layer has a diameter of about 1.00 inches to about 1.60 inches, preferably about 1.20 inches to about 1.58 inches, more preferably about 1.30 inches to about 1.56 inches, and most preferably about 1.40 inches to about 1.55 inches. The outermost core layer (comprising the HNP composition) typically has a thickness of about 0.010 inches to about 0.250 inches, preferably about 0.020 inches to about 0.150 inches, more preferably about 0.040 inches to about 0.125 inches, and most preferably about 0.050 inches to about 0.095 inches.

In a three-piece core embodiment, the center or innermost core layer has a diameter of about 0.25 inches to about 1.50 inches, preferably about 0.50 inches to about 1.40 inches, more preferably about 0.75 inches to about 1.30 inches, and most preferably about 1.0 inches to about 1.20 inches. The intermediate core layer (between the innermost core layer (or center) and the outer core layer) typically has a thickness of about 0.050 inches to about 0.550 inches, preferably about 0.100 inches to about 0.300 inches, more preferably about 0.125 inches to about 0.290 inches, and most preferably about 0.200 inches to about 0.275 inches. The outermost core layer (comprising HNP) typically has a thickness of about 0.010 inches to about 0.250 inches, preferably about 0.020 inches to about 0.150 inches, more preferably about 0.040 inches to about 0.125 inches, and most preferably about 0.050 inches to about 0.095 inches.

In a preferred embodiment, the innermost core (center) has an outer surface hardness that is at least 5 Shore C less than the hardness of both the inner and outer surfaces of the outer core layer, preferably at least 7 Shore C less, most preferably at least 9 Shore C less.

The inner core surface hardness typically ranges from about 50 Shore C to about 96 Shore C; preferably about 57 Shore C to about 89 Shore C; more preferably about 63 Shore C to about 82 Shore C; most preferably about 63 Shore C, 67 Shore C, 71 Shore C, 75 Shore C, or 79 Shore C. The outer core surface hardness typically ranges from about 57 Shore C to about 100 Shore C; preferably about 63 Shore C to about 96 Shore C; more preferably about 70 Shore C to about 89 Shore C; and most preferably about 70 Shore C, 74 Shore C, 81 Shore C, 82 Shore C, or 86 Shore C.

In a preferred embodiment, the innermost core (center) has an outer surface hardness that is at least 3 Shore D less than the hardness of both the inner and outer surfaces of the outer core layer, preferably at least 5 Shore D less, more preferably at least 7 Shore D less.

The inner core surface hardness typically ranges from about 30 Shore D to about 65 Shore D; preferably about 35

Shore D to about 60 Shore D; more preferably about 40 Shore D to about 55 Shore D; most preferably about 40 Shore D, 43 Shore D, 46 Shore D, 49 Shore D, or 52 Shore D. The outer core surface hardness typically ranges from about 35 Shore D to about 70 Shore D; preferably about 40 Shore D to about 65 Shore D; more preferably about 45 Shore D to about 60 Shore D; and most preferably about 45 Shore D, 48 Shore D, 51 Shore D, 54 Shore D, or 57 Shore D.

In an alternative embodiment, the surface hardness of the innermost core layer (the center) is essentially the same as the inner and outer surface hardness of the outer core layer. In a three-piece core embodiment, the surface hardness of the innermost core layer (the center) is essentially the same as the inner and outer surface hardness of the intermediate core layer and/or the inner and outer surface hardness of the outer core layer.

The present multilayer golf ball can have an overall diameter of any size. Although the USGA specifications limit the minimum size of a competition golf ball to 1.680 inches. There is no specification as to the maximum diameter. Golf balls of any size, however, can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches.

The golf balls of the present invention should have a moment of inertia ("MOI") of less than about 85 and, preferably, less than about 83. The MOI is typically measured on model number MOI-005-104 MOI Instrument manufactured by Inertia Dynamics of Collinsville, Conn. The instrument is plugged into a PC for communication via a COMM port and is driven by MOI Instrument Software version #1.2. U.S. Pat. Nos. 6,193,619; 6,207,784; 6,221,960; 6,414,082; 6,476,130; and 6,287,638 are incorporated in their entirety herein by express reference thereto. The highly-neutralized polymers of the present invention may also be used in golf equipment, in particular, inserts for golf clubs, such as putters, irons, and woods, and in golf shoes and components thereof.

As used herein, the term "about," used in connection with one or more numbers or numerical ranges, should be understood to refer to all such numbers, including all numbers in a range. Other than in the operating examples, or unless otherwise expressly specified, all of the numerical ranges, amounts, values and percentages such as those for amounts of materials, and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used. The invention described and claimed herein is not to be limited in scope by the specific embodiments herein disclosed, since these embodiments are intended solely as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A golf ball comprising:
    an inner core layer comprising a thermoset rubber composition and having a first outer surface hardness;
    a thermoplastic outer core layer having a second outer surface hardness, an inner surface hardness, and comprising a copolymer of ethylene and an $\alpha,\beta$-unsaturated carboxylic acid, an organic acid or salt thereof, and sufficient cation source to fully-neutralize the acid groups of the copolymer;
    an inner cover layer; and
    an outer cover layer;
    wherein the first outer surface hardness is substantially the same as the second outer surface hardness and the inner surface hardness.

2. The golf ball of claim 1, wherein the cation source is selected from a group consisting of metal cations of lithium, sodium, potassium, magnesium, calcium, barium, lead, tin, zinc, and aluminum.

3. The golf ball of claim 1, wherein the organic acid salt comprises an organic acid selected from the group consisting of aliphatic organic acids, aromatic organic acids, saturated mono- or multi-functional organic acids, unsaturated mono- or multi-functional organic acids, and multi-unsaturated mono- or multi-functional organic acids.

4. The golf ball of claim 1, wherein the organic acid comprises stearic acid, behenic acid, erucic acid, oleic acid, linoelic acid or dimerized derivatives thereof.

5. The golf ball of claim 1, wherein the organic acid salt comprises a cation selected from the group consisting of barium, lithium, sodium, zinc, bismuth, chromium, cobalt, copper, potassium, strontium, titanium, tungsten, magnesium, cesium, iron, nickel, silver, aluminum, tin, and calcium.

6. The golf ball of claim 1, wherein the outer cover is a castable polyurea or polyurethane.

7. The golf ball of claim 1, wherein the inner cover layer comprises a polyurethane, a polyurea, a polyurethane-urea hybrid, a polyurea-urethane hybrid, or an ionomer.

8. The golf ball of claim 1, wherein the inner core has a diameter of 0.8 inches to 1.4 inches.

9. The golf ball of claim 1, wherein the thermoplastic outer core layer has a thickness of 0.040 inches or greater.

10. The golf ball of claim 9, wherein the thermoplastic outer core layer has a thickness of 0.090 inches to 0.180 inches.

* * * * *